US012377535B2

(12) United States Patent
Terasawa

(10) Patent No.: US 12,377,535 B2
(45) Date of Patent: Aug. 5, 2025

(54) ROBOT CONTROL APPARATUS, ROBOT CONTROL METHOD, AND PROGRAM

(71) Applicant: Sony Group Corporation, Tokyo (JP)

(72) Inventor: Ryo Terasawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 278 days.

(21) Appl. No.: 18/002,052

(22) PCT Filed: Jun. 28, 2021

(86) PCT No.: PCT/JP2021/024349
§ 371 (c)(1),
(2) Date: Dec. 16, 2022

(87) PCT Pub. No.: WO2022/014312
PCT Pub. Date: Jan. 20, 2022

(65) Prior Publication Data
US 2023/0347509 A1 Nov. 2, 2023

(30) Foreign Application Priority Data

Jul. 16, 2020 (JP) .............................. 2020-121860

(51) Int. Cl.
*B25J 9/16* (2006.01)
*G06T 7/11* (2017.01)
*G06T 7/80* (2017.01)

(52) U.S. Cl.
CPC .......... *B25J 9/1612* (2013.01); *B25J 9/1697* (2013.01); *G06T 7/11* (2017.01); *G06T 7/80* (2017.01);
(Continued)

(58) Field of Classification Search
CPC ...... B25J 9/1612; B25J 19/023; B25J 9/1697; G06T 7/11; G06T 7/80;
(Continued)

(56) References Cited

U.S. PATENT DOCUMENTS 9,298,974 B1 * 3/2016 Kuo ..................... H04N 13/239
9,303,982 B1 * 4/2016 Ivanchenko ........... G01B 11/22
(Continued)

FOREIGN PATENT DOCUMENTS

| JP | H09-26812 A | 1/1997 |
|---|---|---|
| JP | 2005-169564 A | 6/2005 |

(Continued)

OTHER PUBLICATIONS

International Search Report and Written Opinion mailed on Sep. 7, 2021, received for PCT Application PCT/JP2021/024349, filed on Jun. 28, 2021, 8 pages including English Translation.

*Primary Examiner* — Stephen Holwerda
(74) *Attorney, Agent, or Firm* — XSENSUS LLP

(57) ABSTRACT

A system and method generate an overhead camera-based encompassing box that encompasses an object to be gripped included in an image captured by an overhead camera mounted on a robot and a hand camera-based encompassing box that encompasses the object to be gripped included in an image captured by a hand camera mounted on the robot. Moreover, a relative position of a target gripping position of the object to be gripped with respect to the overhead camera-based encompassing box in the image captured by the overhead camera is calculated, the target gripping position with respect to the hand camera-based encompassing box in the image captured by the hand camera is calculated on the basis of the calculated relative position, and the calculated position is set as a corrected target gripping
(Continued)

position of the object to be gripped included in the image captured by the hand camera.

14 Claims, 18 Drawing Sheets

(52) U.S. Cl.
CPC ............... *G06T 2207/10028* (2013.01); *G06T 2207/10032* (2013.01)

(58) Field of Classification Search
CPC .......... G06T 2207/10028; G06T 2207/10032; G05B 2219/39542; G05B 2219/40613; G05B 2219/40607
See application file for complete search history.

(56) References Cited

U.S. PATENT DOCUMENTS

| | | | |
|---|---|---|---|
| 9,802,317 B1 | 10/2017 | Watts | |
| 10,471,591 B1* | 11/2019 | Hinkle | B25J 9/1612 |
| 2012/0072023 A1* | 3/2012 | Ota | B25J 9/1664 901/1 |
| 2013/0238131 A1 | 9/2013 | Kondo | |
| 2019/0087976 A1* | 3/2019 | Sugahara | G06T 7/73 |
| 2019/0337152 A1* | 11/2019 | Homberg | B25J 9/1697 |
| 2020/0164507 A1* | 5/2020 | Murase | B25J 9/04 |
| 2020/0189097 A1* | 6/2020 | Ikeda | B25J 9/163 |
| 2020/0311956 A1* | 10/2020 | Choi | G06V 10/454 |
| 2020/0406465 A1* | 12/2020 | Terasawa | B25J 19/04 |

FOREIGN PATENT DOCUMENTS

| | | |
|---|---|---|
| JP | 2007-319938 A | 12/2007 |
| JP | 2009-269110 A | 11/2009 |
| JP | 2013-184257 A | 9/2013 |
| JP | 2015520040 A | 7/2015 |
| WO | WO-2013192490 A2 | 12/2013 |

\* cited by examiner

FIG. 8
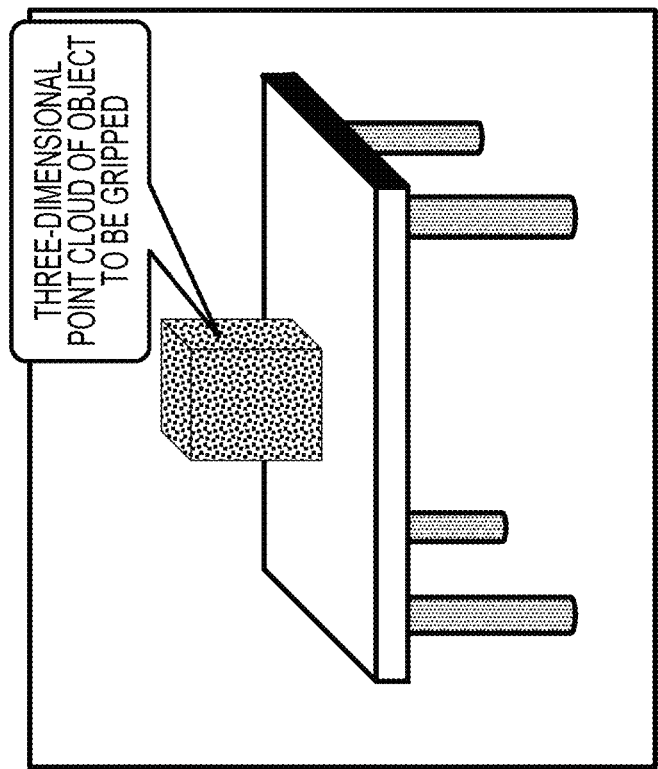
(2) EXAMPLE OF PINT CLOUD OF OBJECT TO BE GRIPPED
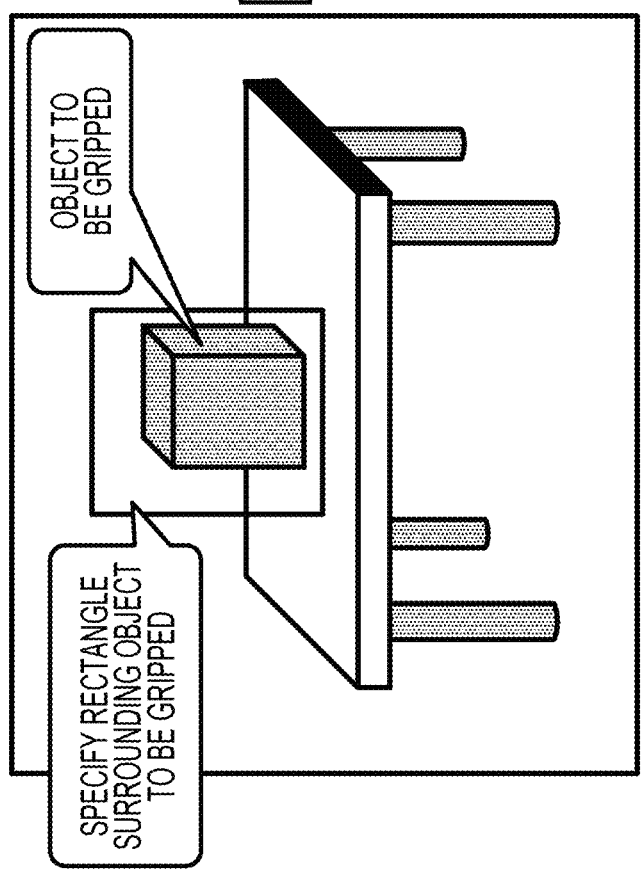
(1) OBJECT TO BE GRIPPED AND OBJECT-TO-BE-GRIPPED SPECIFICATION INFORMATION FIG. 11
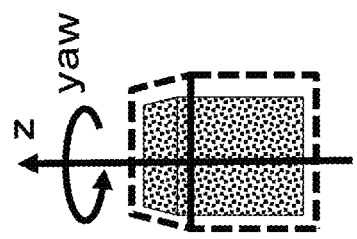
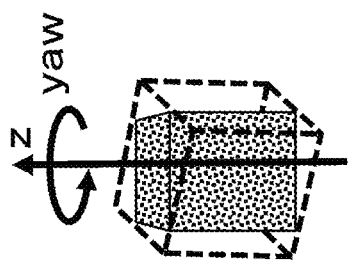
(2a)
GENERATION EXAMPLE OF
ENCOMPASSING BOX (BOUNDING BOX)
(BAD EXAMPLE)
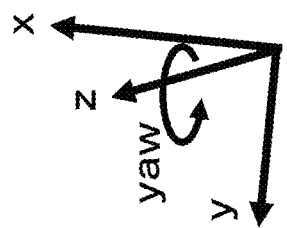
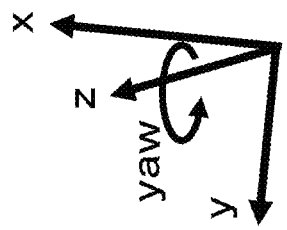
(2b)
GENERATION EXAMPLE OF
ENCOMPASSING BOX (BOUNDING BOX)
(GOOD EXAMPLE)

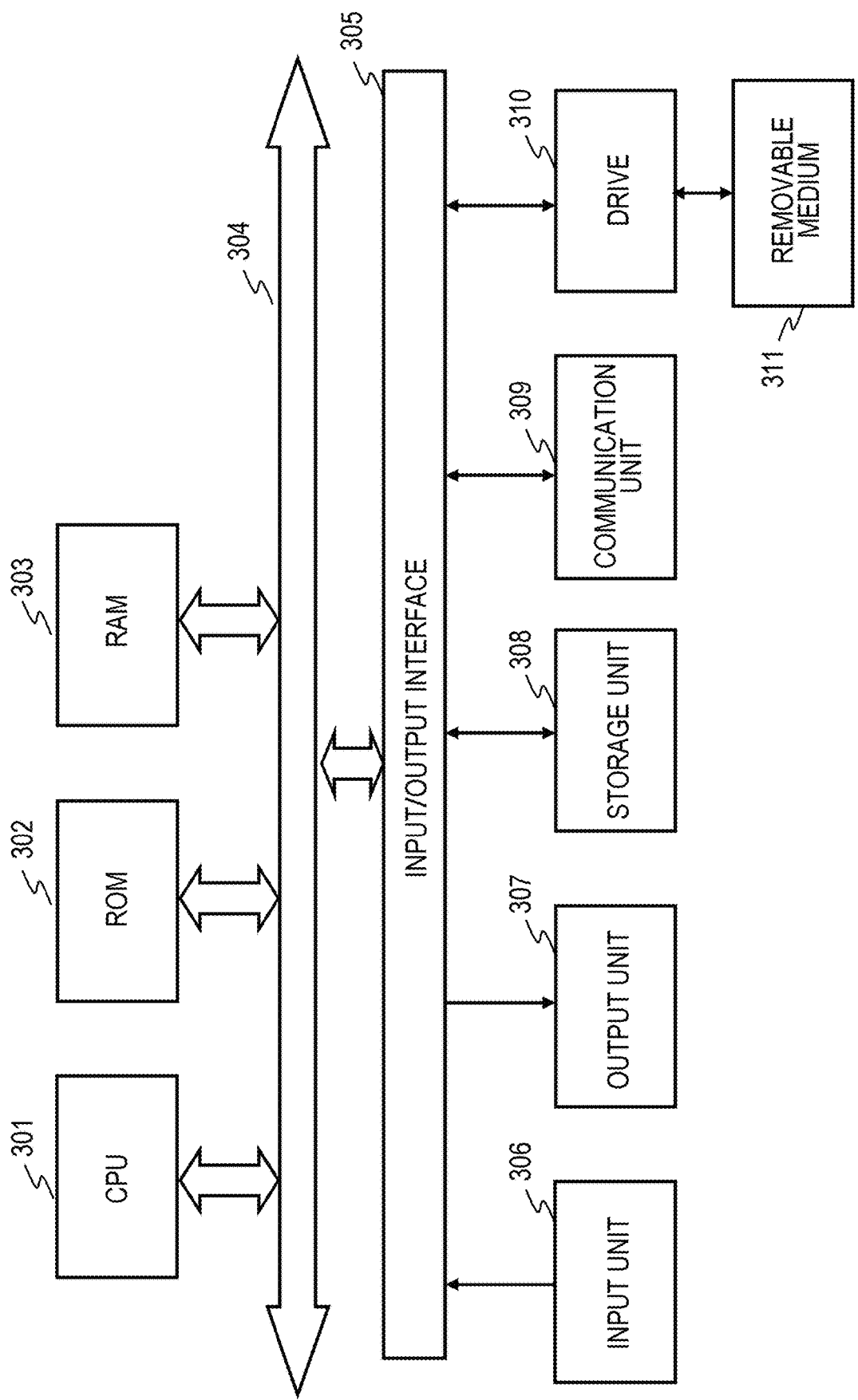

ROBOT CONTROL APPARATUS, ROBOT CONTROL METHOD, AND PROGRAM

CROSS-REFERENCE TO RELATED APPLICATIONS

The present application is based on PCT filing PCT/JP2021/024349, filed Jun. 28, 2021, which claims priority to Japanese Application No. 2020-121860, filed Jul. 16, 2020, the entire contents of each are incorporated herein by reference.

TECHNICAL FIELD

The present disclosure relates to a robot control apparatus, a robot control method, and a program. Specifically, the present invention relates to a robot control apparatus, a robot control method, and a program for controlling an object gripping process performed by a robot.

BACKGROUND ART

In recent years, the use of robots has increased in various fields. For example, product assembly using robots is performed in factories, and moreover, care robots and the like are developed.

There are various processes performed by these robots, and an example thereof is a process of gripping and moving an object.

For example, in the case of an assembly robot used in a factory, processing is performed in which a part used for product assembly is gripped using a hand having a gripping mechanism connected to an arm of the robot, the part is moved to a predetermined position in the gripped state, and the gripping is released to mount the part onto another object.

Furthermore, for example, in the case of a care robot, processing is performed in which a cup placed on a table, which is not reachable by a hand of a user, is gripped by a hand of the robot, carried to a position that is reachable by the hand of the user, and handed over to the user.

In a case where such an object gripping process is performed by a robot, for example, processing is performed in which a peripheral image is captured by an overhead camera having a field of view in which a peripheral situation of the robot can be grasped as a whole, the captured image is analyzed to confirm a position of an object to be gripped, and a hand is moved to the position of the object to be gripped to grip the object to be gripped.

However, if there is an error in position information acquired on the basis of the analysis of the image captured by the overhead camera, there is a case where a movement destination of the hand deviates from a target gripping position to cause a failure in the gripping process.

Moreover, there is also a possibility that a hand tip position of the robot deviates from a position to be reached originally due to effects of mechanical errors (deflection and rattling) of the arm of the robot, and these errors can also be factors of the gripping failure.

Patent Document 1 (Japanese Patent Application Laid-Open No. 2007-319938) discloses a technique for solving such a problem.

Patent Document 1 discloses a configuration in which a hand camera is mounted on a hand unit that performs an object gripping process in addition to an overhead camera in a robot to use these two cameras.

In this configuration, the hand that performs an image of the object gripping process is captured by the overhead camera to grasp a positional relationship between the overhead camera and the hand, and then, an object to be gripped is recognized by the hand camera.

When this method is applied, however, the overhead camera needs to capture the hand unit in addition to capturing the object to be gripped, and there occurs a problem that a range that can be gripped is limited to an object in the vicinity of the hand unit.

Furthermore, in the configuration disclosed in Patent Document 1, shape data of the object to be gripped is stored in advance in a storage unit, and the object to be gripped is recognized using the shape data. Therefore, there is a problem of a difficulty in application to a process of gripping an unknown object for which shape data is not stored.

CITATION LIST

Patent Document

Patent Document 1: Japanese Patent Application Laid-Open No. 2007-319938
Patent Document 2: Japanese Patent Application Laid-Open No. 2013-184257

SUMMARY OF THE INVENTION

Problems to be Solved by the Invention

The present disclosure has been made in view of the problems described above, for example, and an object thereof is to provide a robot control apparatus, a robot control method, and a program that enable reliable execution of a gripping process even in a case where there is no registration data on a shape of an object to be gripped in a configuration for gripping the object using a robot.

Solutions to Problems

A first aspect of the present disclosure is a robot control apparatus including: an encompassing box generation unit that generates a first camera-based encompassing box that encompasses an object to be gripped included in an image captured by a first camera mounted on a robot, and a second camera-based encompassing box that encompasses the object to be gripped included in an image captured by a second camera mounted on the robot; a gripping position calculation unit that calculates a relative position of a target gripping position of the object to be gripped with respect to the first camera-based encompassing box in the image captured by the first camera, calculates the target gripping position with respect to the second camera-based encompassing box in the image captured by the second camera on the basis of the calculated relative position, and sets the calculated target gripping position as a corrected target gripping position of the object to be gripped included in the image captured by the second camera; and a control information generation unit that generates control information for causing a hand of the robot to grip the corrected target gripping position in the image captured by the second camera.

Moreover, a second aspect of the present disclosure is a robot control method executed in a robot control apparatus, the robot control method including: an encompassing box generation step of generating, by an encompassing box generation unit, a first camera-based encompassing box that encompasses an object to be gripped included in an image captured by a first camera mounted on a robot, and a second camera-based encompassing box that encompasses the object to be gripped included in an image captured by a second camera mounted on the robot; a gripping position calculation step of calculating, by a gripping position calculation unit, a relative position of a target gripping position of the object to be gripped with respect to the first camera-based encompassing box in the image captured by the first camera, calculates the target gripping position with respect to the second camera-based encompassing box in the image captured by the second camera on the basis of the calculated relative position, and sets the calculated position as a corrected target gripping position of the object to be gripped included in the image captured by the second camera; and a control information generation step of generating, by a control information generation unit, control information for causing a hand of the robot to grip the corrected target gripping position in the image captured by the second camera.

Moreover, a third aspect of the present disclosure is a program configured to execute robot control processing in a robot control apparatus, the program including:

causing an encompassing box generation unit to execute an encompassing box generation step of generating a first camera-based encompassing box that encompasses an object to be gripped included in an image captured by a first camera mounted on a robot, and a second camera-based encompassing box that encompasses the object to be gripped included in an image captured by a second camera mounted on the robot;

causing a gripping position calculation unit to execute a gripping position calculation step of calculating a relative position of a target gripping position of the object to be gripped with respect to the first camera-based encompassing box in the image captured by the first camera, calculates the target gripping position with respect to the second camera-based encompassing box in the image captured by the second camera on the basis of the calculated relative position, and sets the calculated position as a corrected target gripping position of the object to be gripped included in the image captured by the second camera; and causing a control information generation unit to execute a control information generation step of generating control information for causing a hand of the robot to grip the corrected target gripping position in the image captured by the second camera.

Note that the program of the present disclosure is, for example, a program that can be provided as a storage medium or a communication medium provided in a computer-readable form to an information processing apparatus or a computer system that can execute various program codes. As such a program is provided in the computer-readable form, processing according to the program can be realized on the information processing apparatus or the computer system.

Still other objects, characteristics and advantages of the present disclosure will become apparent from a detailed description based on embodiments of the present disclosure as described later and accompanying drawings. Note that the term "system" in the present specification refers to a logical set configuration of a plurality of apparatuses, and is not limited to a system in which apparatuses of the respective configurations are provided in the same housing.

According to a configuration of an embodiment of the present disclosure, an apparatus and a method that enable reliable execution of an object gripping process performed by a robot are achieved.

Specifically, for example, an overhead camera-based encompassing box that encompasses an object to be gripped included in an image captured by an overhead camera mounted on a robot and a hand camera-based encompassing box that encompasses the object to be gripped included in an image captured by a hand camera mounted on the robot are generated. Moreover, a relative position of a target gripping position of the object to be gripped with respect to the overhead camera-based encompassing box in the image captured by the overhead camera is calculated, the target gripping position with respect to the hand camera-based encompassing box in the image captured by the hand camera is calculated on the basis of the calculated relative position, and the calculated position is set as a corrected target gripping position of the object to be gripped included in the image captured by the hand camera. Moreover, control information for causing a hand of the robot to grip the corrected target gripping position in the image captured by the hand camera is generated, and a gripping process performed by the robot is executed.

According to this configuration, the apparatus and the method that enable the reliable execution of the object gripping process performed by the robot are achieved.

Note that the effects described in the present specification are merely examples and are not limited, and there may be additional effects.

BRIEF DESCRIPTION OF DRAWINGS

FIG. 8 is a diagram for describing a specific example of a process of extracting a point cloud of the object to be gripped.

FIG. 11 is a diagram for describing a specific example of the encompassing box (bounding box) generation process.

FIG. 18 is a diagram for describing a hardware configuration example of the robot control apparatus of the present disclosure.

MODE FOR CARRYING OUT THE INVENTION

Hereinafter, a robot control apparatus, a robot control method, and a program of the present disclosure will be described in detail with reference to the drawings. Note that a description will be made according to the following items.
1. Regarding Outline of Object Gripping Process Performed by Robot
2. Regarding Problem in Gripping Process of Robot
3. Regarding Configuration example of Robot Control Apparatus of Present Disclosure
4. Regarding Details of Processing Executed by Robot Control Apparatus of Present Disclosure
5. Regarding Modification Examples and Application Examples of Robot Control apparatus of Present Disclosure
6. Regarding Hardware Configuration Example of Robot Control Apparatus of Present Disclosure
7. Summary of Configuration of Present Disclosure

[1. Regarding Outline of Object Gripping Process Performed by Robot]

First, an outline of an object gripping process performed by a robot will be described with reference to FIG. 1 and subsequent drawings.

Figure 1:
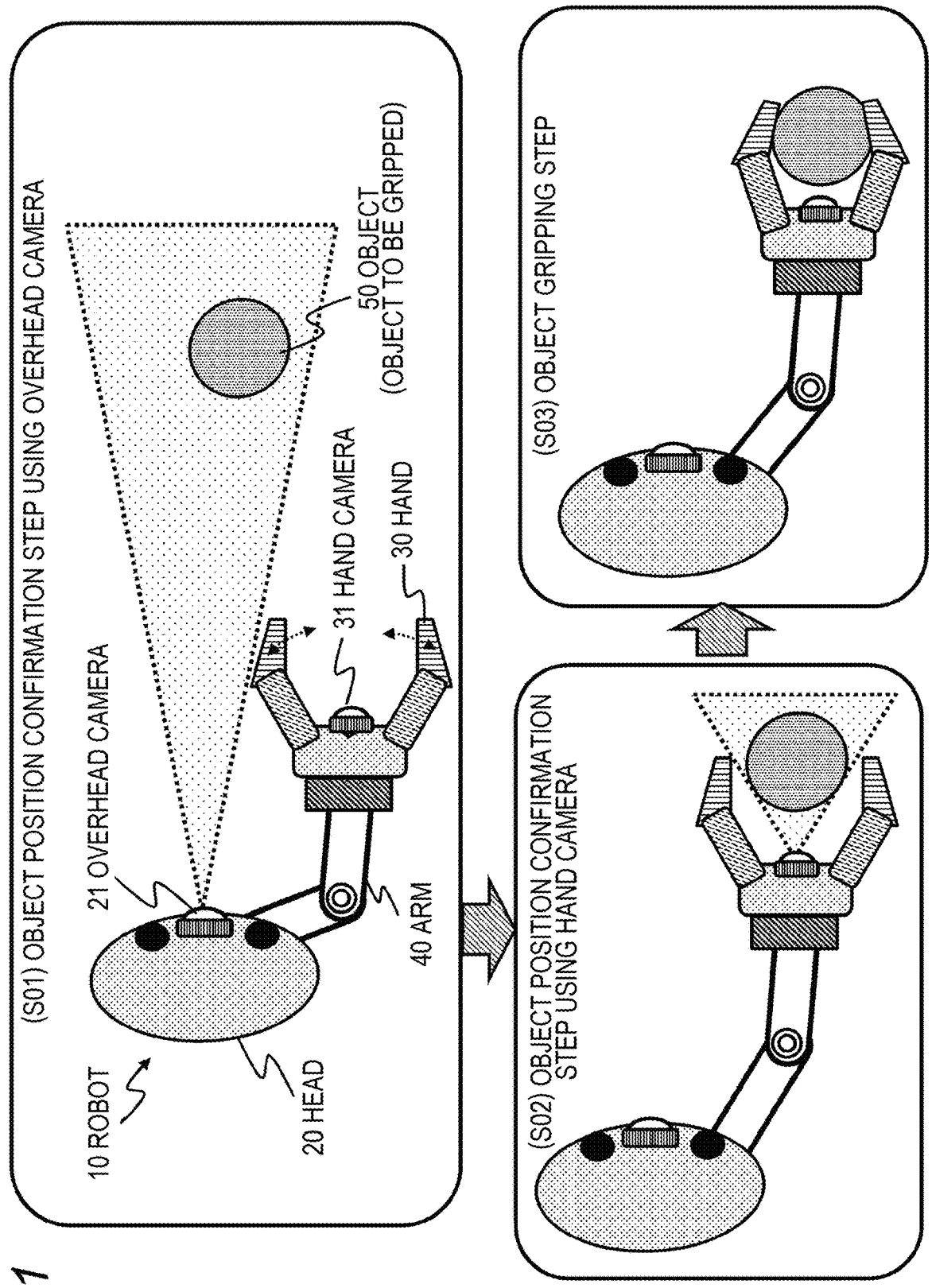
FIG. 1 is a diagram for describing exemplary operations and control processing of a robot.

FIG. 1 is a diagram for describing a sequence of processing when a robot 10 grips an object 50 which is an object to be gripped.

The robot 10 performs operations in the order of steps S01 to S03 illustrated in the drawing to grip the object 50.

The robot 10 includes a head 20, a hand 30, and an arm 40. The hand 30 is connected to a robot body via the arm 40, and has a configuration capable of changing a position, an orientation, and the like of the hand 30 under the control of the arm 40.

The hand 30 has movable portions, which are rotatable and correspond to fingers of a person, on both sides, and has a configuration capable of performing an object gripping operation and an object releasing operation.

Note that the robot 10 moves by driving a drive unit such as a leg or a wheel, for example, and further moves the hand 30 to a position where the object 50 can be gripped by controlling the arm 40.

Alternatively, the robot body 10 may not move, and the hand 30 may be brought close to the object by the control of only the arm 40.

The processing of the present disclosure can be applied to any configuration. Note that a configuration example in which the body of the robot 10 is also movable will be described as an example in the embodiment to be described hereinafter.

The robot 10 includes two cameras configured to confirm a position and the like of the object 50 which is the object to be gripped.

One is an overhead camera 21 mounted on the head 20, and the other is a hand camera 31 mounted on the hand 30.

Note that the overhead camera 21 and the hand camera 31 are not limited to cameras for capturing visible light images, and include sensors capable of acquiring a distance image and the like. However, it is preferable to use a camera or a sensor that can obtain three-dimensional information. For example, a stereo camera, a sensor such as a ToF sensor or a Lidar, or a combination of these sensors and a monocular camera may be used. It is preferable to use a camera or a sensor capable of acquiring data that enables analysis of a three-dimensional position of the object to be gripped.

FIG. 1 (step S01) illustrates a position confirmation step of the object 50 using the overhead camera 21.

A data processor in the robot 10 detects the object 50, which is the object to be gripped, from an image captured by the overhead camera 21 and calculates a three-dimensional position of the object 50. After confirming the position, the data processor of the robot 10 moves so as to approach the object 50.

(Step S02) illustrates a process in which the robot 10 that has approached the object 50 moves the hand 30 to a position where the object 50 can be gripped.

This hand position control is executed on the basis of analysis of an image captured by the hand camera 31 mounted on the hand 30.

The data processor in the robot 10 detects the object 50, which is the object to be gripped, from the image captured by the hand camera 31 and calculates a three-dimensional position of the object 50. After confirming the position, the data processor of the robot 10 performs an adjustment process of setting the position and the orientation of the hand 30 to a state in which the object 50 can be gripped.

(Step S03) illustrates a gripping process after the adjustment process of the hand 30 in step S02.

The movable portions on the both sides of the hand 30 are operated to grip the object 50.

A detailed sequence of the object gripping process sequence will be described with reference to FIG. 2.

Figure 2:
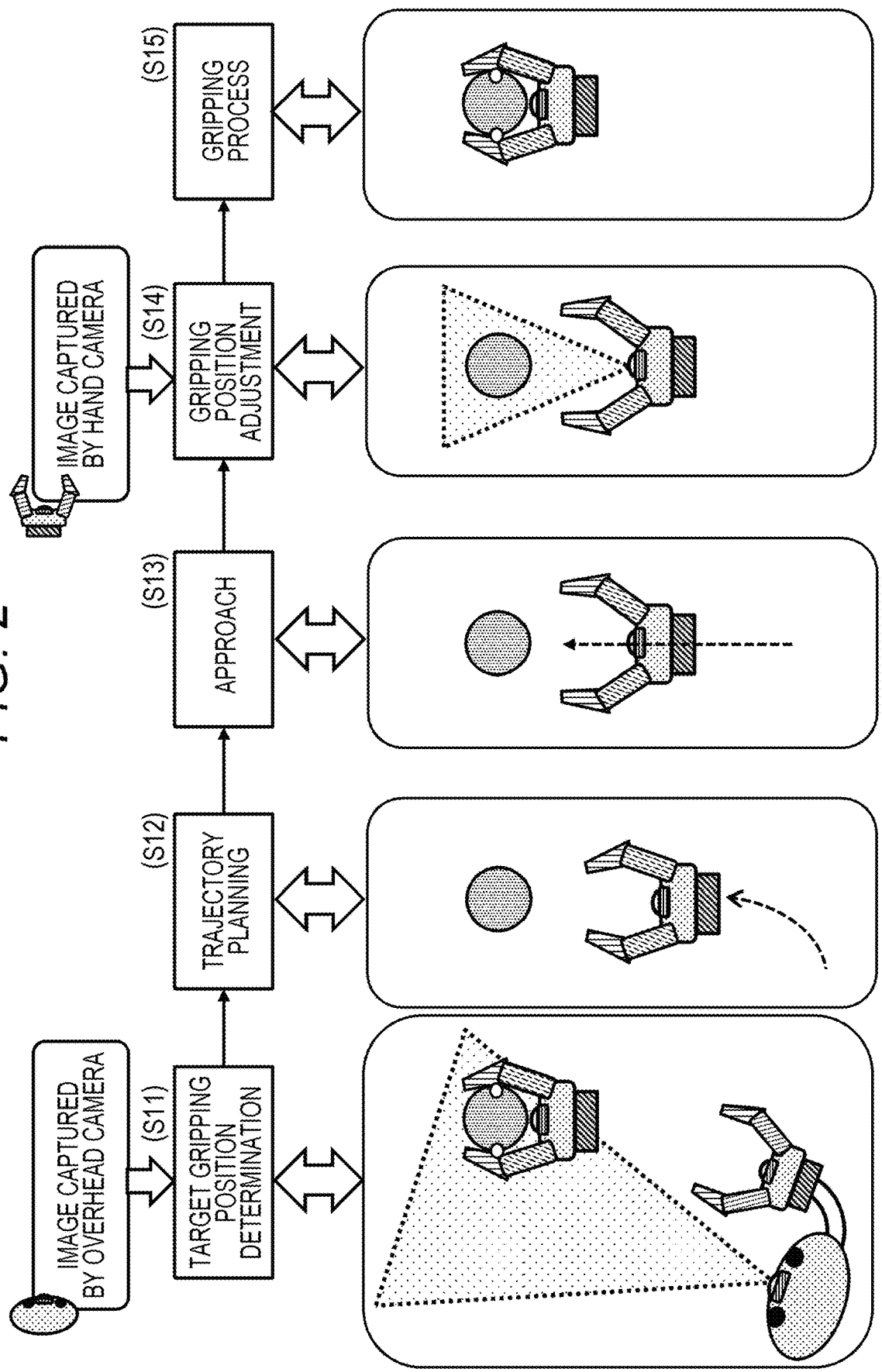
FIG. 2 is a diagram for describing exemplary operations and control processing of the robot.

FIG. 2 is a diagram illustrating a gripping sequence of the object 50 by the robot 10 described above with reference to FIG. 1 in a more detailed processing unit.

The processing is executed in the order of steps S11 to S15 illustrated in FIG. 2.

Hereinafter, the respective processing steps will be sequentially described.

(Step S11)

First, in step S11, a target gripping position determination process is executed.

First, an image captured by the overhead camera 21 mounted on the head 20 of the robot 10 is analyzed to detect the object 50, which is the object to be gripped, and a position of the object 50 is analyzed.

(Step S12)

Step S12 is a trajectory planning step.

The data processor of the robot 10 generates a movement route of the robot or the hand to approach the calculated position of the object 50, that is, a trajectory plan on the basis of information on the position of the object 50, which is the object to be gripped, calculated in step S11. Note that a position of the hand 30 after the movement may be any position as long as the object to be gripped can be observed from the hand camera 31 mounted on the hand 30.

(Step S13)

Next, in step S13, the robot and the hand are moved according to the trajectory generated in step S12. As described above, the position of the hand 30 after the movement is the position where the object to be gripped can be observed from the hand camera 31 attached to the hand 30.

(Step S14)

Next, in step S14, the position and an orientation of the hand 30 are finely adjusted.

This hand position control is executed on the basis of analysis of an image captured by the hand camera 31 mounted on the hand 30.

The data processor in the robot 10 detects the object 50, which is the object to be gripped, from the image captured by the hand camera 31 and calculates a position of the object 50. After confirming the position, the data processor of the robot 10 performs an adjustment process of setting the position and the orientation of the hand 30 to a state in which the object 50 can be gripped.

(Step S15)

Finally, the movable portions on the both sides of the hand 30 are operated to grip the object 50.

In this manner, the robot 10 first confirms the position of the object 50, which is the object to be gripped, on the basis of the image captured by the overhead camera 21 mounted on the head 20.

Thereafter, after the hand 30 approaches the object 50, a process of analyzing the image captured by the hand camera 31 mounted on the hand 30, and finely adjusting the position and the orientation of the hand 30 to grip the object 50 is performed.

[2. Regarding Problem in Gripping Process of Robot]

Next, a problem in the gripping process of the robot described with reference to FIGS. 1 and 2 will be described.

The problem in the gripping process of the robot will be described with reference to FIG. 3.

Figure 3:
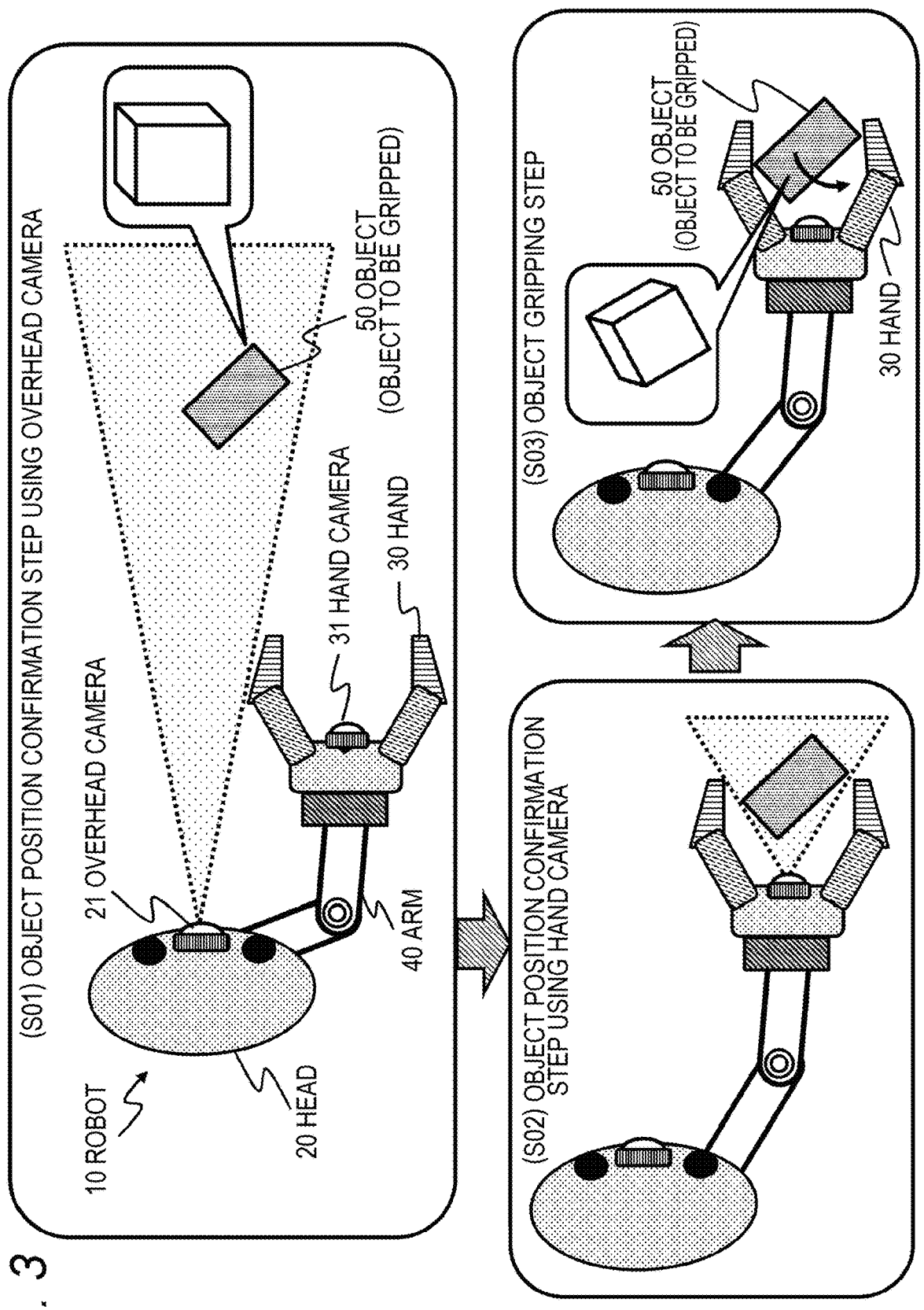
FIG. 3 is a diagram for describing a problem in the operations and the control processing of the robot.

FIG. 3 is a diagram for describing a sequence of processing when the robot 10 grips an object 50, which is an object to be gripped, similarly to FIG. 1 described above.

The robot 10 grips the object 50 by operating in the order of steps S01 to S03 illustrated in the drawing.

Here, a difference from FIG. 1 is a shape of the object 50 which is the object to be gripped.

In the configuration described with reference to FIG. 1, the object 50 as the object to be gripped has a shape on a sphere or a cylinder, but the object 50 as the object to be gripped illustrated in FIG. 3 has a rectangular parallelepiped shape.

FIG. 3 (step S01) illustrates a position confirmation step of the object 50 using the overhead camera 21.

A data processor in the robot 10 detects the object 50, which is the object to be gripped, from an image captured by the overhead camera 21 and calculates a three-dimensional position of the object 50. After confirming the position, the data processor of the robot 10 moves so as to approach the object 50.

(Step S02) illustrates a process in which the robot 10 that has approached the object 50 moves the hand 30 to a position where the object 50 can be gripped.

This hand position control is executed on the basis of analysis of an image captured by the hand camera 31 mounted on the hand 30.

The data processor in the robot 10 detects the object 50, which is the object to be gripped, from the image captured by the hand camera 31 and calculates a position of the object 50. After confirming the position, the data processor of the robot 10 performs an adjustment process of setting the position and the orientation of the hand 30 to a state in which the object 50 can be gripped.

(Step S03) illustrates a gripping process after the adjustment process of the hand 30 in step S02.

The movable portions on the both sides of the hand 30 are operated so as to grip the object 50.

However, the object 50, which is the object to be gripped, has the rectangular parallelepiped shape in the example illustrated in FIG. 3. In a case where the object 50 having such a shape is gripped, the object 50 rotates inside the hand 30 as illustrated in FIG. 3 (S03) so that the gripping process may fail unless an orientation of the hand 30 is set to a specific direction in which the stable gripping process can be performed with respect to the object 50.

For example, in a case where the object 50 is a container containing water, a situation in which the water spills out of the container occurs.

Figure 4:
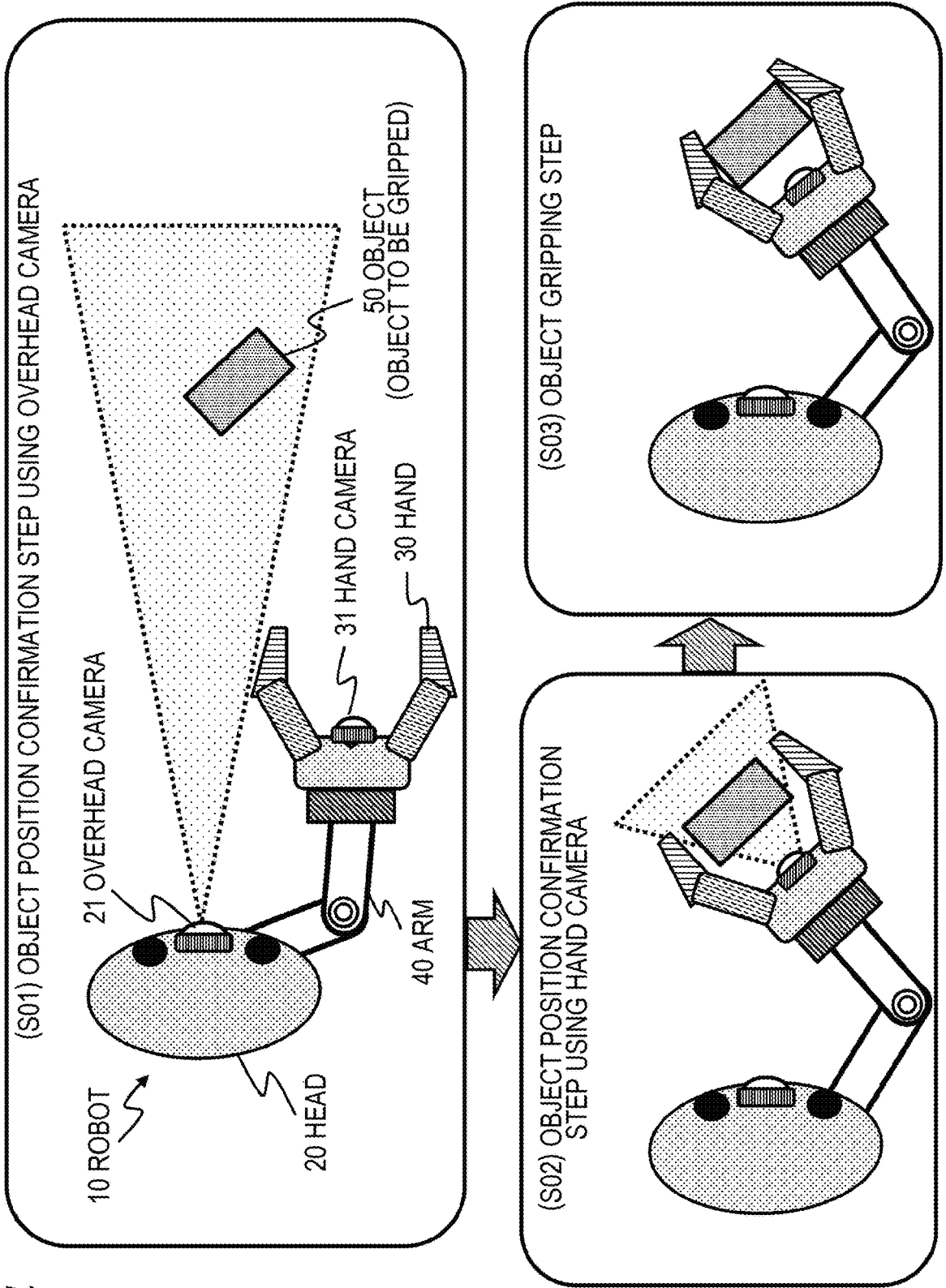
FIG. 4 is a diagram for describing an example of solving the problem in the operations and the control processing of the robot.

FIG. 4 is a diagram illustrating exemplary control processing of the robot 10 for performing a process of stably holding the object 50 having such a rectangular parallelepiped shape.

FIG. 4 illustrates an object gripping process sequence performed by the robot 10 in the case where the object 50, which is the object to be gripped, has the rectangular parallelepiped shape similarly to FIG. 3.

A difference from FIG. 3 is that the gripping process is executed with an orientation of the hand 30 set to a direction in which the stable gripping process can be performed with respect to the object 50 as illustrated in FIG. 4 (S03). When such position and orientation control of the hand 30 is performed, objects having various shapes can be stably gripped.

A robot control apparatus of the present disclosure has a configuration that enables processing illustrated in FIG. 4, that is, the control for stably holding the objects having various shapes.

Hereinafter, the configuration and the processing of the robot control apparatus of the present disclosure will be described.

[3. Regarding Configuration Example of Robot Control Apparatus of Present Disclosure]

Next, a configuration example of the robot control apparatus of the present disclosure will be described.

Figure 5:
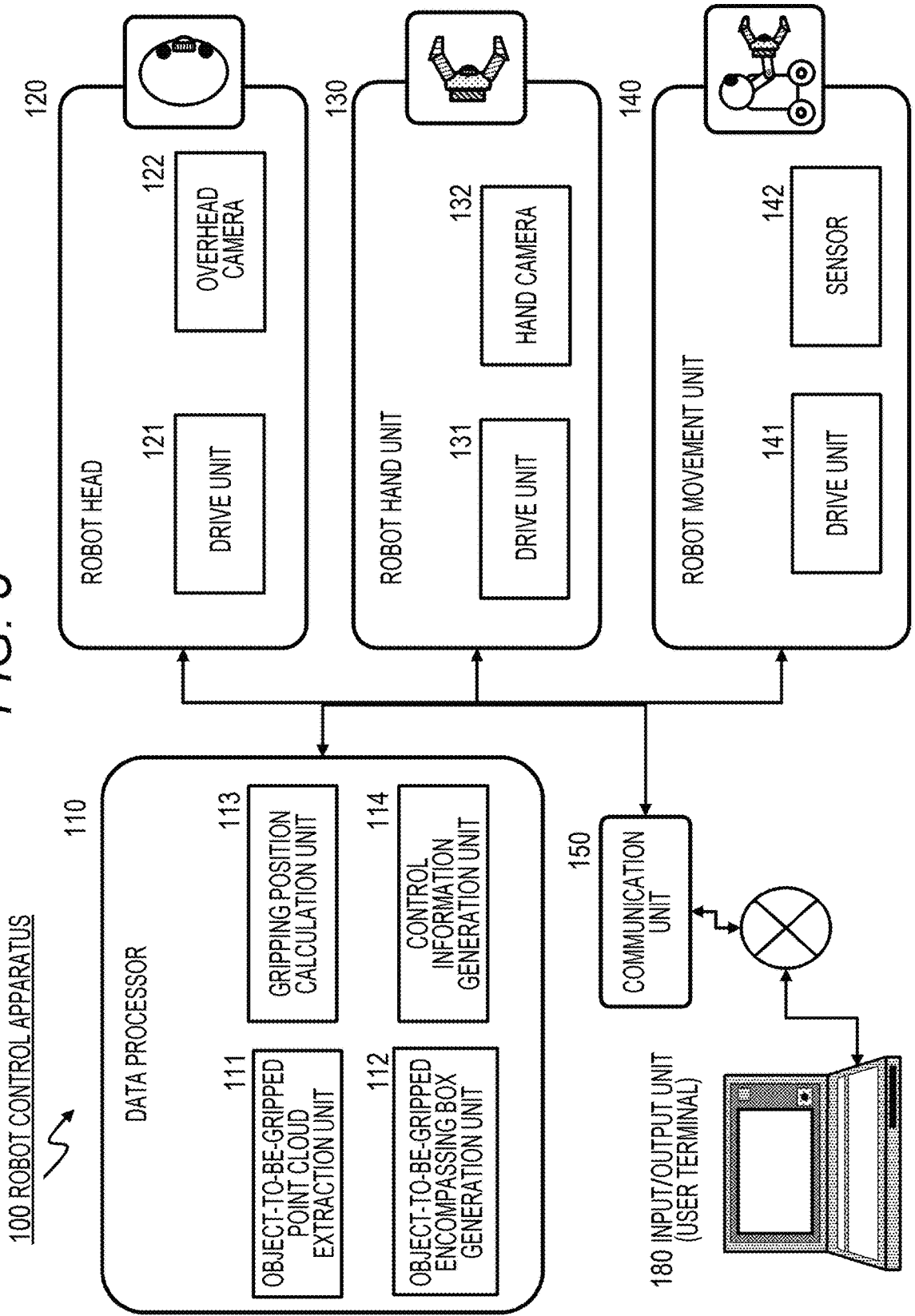
FIG. 5 is a diagram for describing a configuration example of a robot control apparatus of the present disclosure.

FIG. 5 is a block diagram illustrating a configuration example of a robot control apparatus 100 of the present disclosure.

The robot control apparatus 100 of the present disclosure illustrated in FIG. 5 is configured inside the robot 10 illustrated in FIGS. 1 to 4, for example.

As illustrated in FIG. 5, the robot control apparatus 100 of the present disclosure includes a data processor 110, a robot head 120, a robot hand unit 130, a robot movement unit 140, a communication unit 150, and an input/output unit (user terminal) 180.

Note that the input/output unit (user terminal) 180 may be inside the robot body or may be configured as a user terminal that is an independent apparatus different from the robot body.

Furthermore, the data processor 110 may also be inside the robot body or may be configured inside an independent apparatus different from the robot body.

The data processor 110 includes an object-to-be-gripped point cloud extraction unit 111, an object-to-be-gripped encompassing box generation unit 112, a gripping position calculation unit 113, and a control information generation unit 114.

The robot head 120 includes a drive unit 121 and an overhead camera 122.

The robot hand unit 130 includes a drive unit 131 and a hand camera 132.

The robot movement unit 140 includes a drive unit 141 and a sensor 142.

Note that constituent elements illustrated in FIG. 5 illustrate main constituent elements applied to the processing of the present disclosure, and there are various other constituent elements inside the robot, for example, constituent elements such as a storage unit.

The drive unit 121 of the robot head 120 drives the robot head 120 and controls an orientation of the robot head. With this control, an image capturing direction of the overhead camera 122 is controlled.

The overhead camera 122 captures an image observed from the robot head 120.

Note that the overhead camera 122 is not limited to a camera for capturing a visible light image, and may be a sensor capable of acquiring a distance image or the like. However, it is preferable to use a camera or a sensor that can obtain three-dimensional information. For example, a stereo camera, a sensor such as a ToF sensor or a Lidar, or a combination of these sensors and a monocular camera may be used. It is preferable to use a camera or a sensor capable of acquiring data that enables analysis of a three-dimensional position of the object to be gripped.

However, a three-dimensional position of an object in a captured image can be analyzed by performing a process of analyzing continuously captured images, for example, a simultaneous localization and mapping (SLAM) process or the like only with the monocular camera, and in a case where the robot control apparatus 100 has a configuration to perform such an analysis process, the overhead camera 122 may be the monocular camera.

Note that the simultaneous localization and mapping (SLAM) process is a process of executing self-localization (localization) and environment map creation (mapping) in parallel.

The drive unit 131 of the robot hand unit 130 controls an orientation of the robot hand and controls a gripping operation.

The hand camera 132 is a camera that captures an image of the immediately front of the robot hand unit 130.

The hand camera 132 is not limited to a camera for capturing a visible light image, and may be a sensor capable of acquiring a distance image or the like. However, it is preferable to use a camera or a sensor that can obtain three-dimensional information. For example, a stereo camera, a sensor such as a ToF sensor or a Lidar, or a combination of these sensors and a monocular camera may be used. It is preferable to use a camera or a sensor capable of acquiring data that enables analysis of a three-dimensional position of the object to be gripped.

However, in a case where the robot control apparatus 100 is configured to perform a process of analyzing a three-dimensional position of an object in a captured image by, for example, the SLAM process or the like, the hand camera 132 may also be the monocular camera similarly to the overhead camera 122 described above.

The drive unit 141 of the robot movement unit 140 is, for example, a drive unit that performs driving of a leg or driving of a wheel, and performs drive processing for moving the robot body.

The sensor 142 is a sensor configured to perform detection of an obstacle in a movement direction of the robot and the like, and includes a camera, a ToF sensor, a Lidar, and the like.

The data processor 110 includes an object-to-be-gripped point cloud extraction unit 111, an object-to-be-gripped encompassing box generation unit 112, a gripping position calculation unit 113, and a control information generation unit 114.

The object-to-be-gripped point cloud extraction unit 111 executes a process of extracting a point cloud (three-dimensional point cloud) indicating an object to be gripped included in an image captured by the overhead camera 122 and an image captured by the hand camera 132. The point cloud corresponds to a point cloud (three-dimensional point cloud) indicating an outer shape of an object as the object to be gripped, that is, a three-dimensional shape of the object. A specific processing example will be described later.

The object-to-be-gripped encompassing box generation unit 112 generates an "object-to-be-gripped encompassing box" that encompasses a three-dimensional point cloud on the basis of the three-dimensional point cloud of an object to be gripped generated by the object-to-be-gripped point cloud extraction unit 111.

The "object-to-be-gripped encompassing box" is a box that encompasses a point cloud indicating a three-dimensional shape of the object to be gripped, and the shape is not particularly limited, and may be a rectangular parallelepiped, a cylinder, a cone, a torus, or the like. Note that, in the following embodiment, an example in which a rectangular parallelepiped encompassing solid (bounding box) is used as the "object-to-be-gripped encompassing box" will be described as an example.

The gripping position calculation unit 113 executes, for example, the following processes.

Executed are these processes of:
(1) a process of calculating a relative relationship between an object-to-be-gripped encompassing box (bounding box) of the object to be gripped in an image captured by the overhead camera and a target gripping position; and
(2) a process of calculating a corrected target gripping position which is a relative position of the target gripping position with respect to the object to be gripped (bounding box) in an image captured by a hand camera by applying the relative relationship between the object-to-be-gripped encompassing box (bounding box) of the object to be gripped in the image captured by the overhead camera and the target gripping position.

The target gripping position is, for example, a targeted gripping position set by a user while viewing the image captured by the overhead camera using the input/output unit (user terminal) 180. The target gripping position is a gripping position at which the object to be gripped can be stably gripped by the hand of the robot, and corresponds to, for example, a contact position between the hand and the object to be gripped in the process of gripping the object to be gripped by the hand, for example.

For example, in a case where a gripper-type hand that sandwiches the object 50 from both sides as described with reference to FIGS. 1 to 4 is used, target gripping positions are set at two locations on both sides of the object 50. A specific example and details thereof will be described later.

The gripping position calculation unit 113 generates the following two object-to-be-gripped encompassing boxes (bounding boxes) of the object to be gripped in the images captured by different cameras, that is, (a) the object-to-be-gripped encompassing box (bounding box) of the object to be gripped in the image captured by the overhead camera, and (b) the object-to-be-gripped encompassing box (bounding box) of the object to be gripped in the image captured by the hand camera, and makes a relative position between each of the encompassing boxes (bounding boxes) and each of gripping positions consistent, thereby calculating which position of the object to be gripped included in the image captured by the hand camera the target gripping position set by the user corresponds to.

This calculated position is defined as a corrected target gripping position.

The control information generation unit 114 generates control information for causing the hand of the robot to grip the "corrected target gripping position" calculated by the gripping position calculation unit 113. This control information is output to the drive unit 141 of the robot movement unit 140 and the drive unit 131 of the robot hand unit 130.

The drive unit 141 of the robot movement unit 140 and the drive unit 131 of the robot hand unit 130 execute the drive processing in accordance with the control information generated by the control information generation unit 114, that is, the control information to cause the hand of the robot to grip the "corrected target gripping position" calculated by the gripping position calculation unit 113.

With this drive processing, the hand of the robot can grip the "corrected target gripping position".

The "corrected target gripping position" is a gripping position that coincides with the target gripping position specified by the user while viewing a bird's-eye view image, and is a gripping position set on the object to be gripped included in the image captured by the hand camera. Since the hand of the robot grips the corrected target gripping position set on the object to be gripped included in the image captured by the hand camera, the object can be stably gripped. Note that it is assumed that the target gripping position specified by the user while viewing the bird's-eye view image does not include a recognition error and a mechanical error.

[4. Regarding Details of Processing Executed by Robot Control Apparatus of Present Disclosure]

Next, details of processing executed by the robot control apparatus 100 of the present disclosure will be described.

Figure 6:
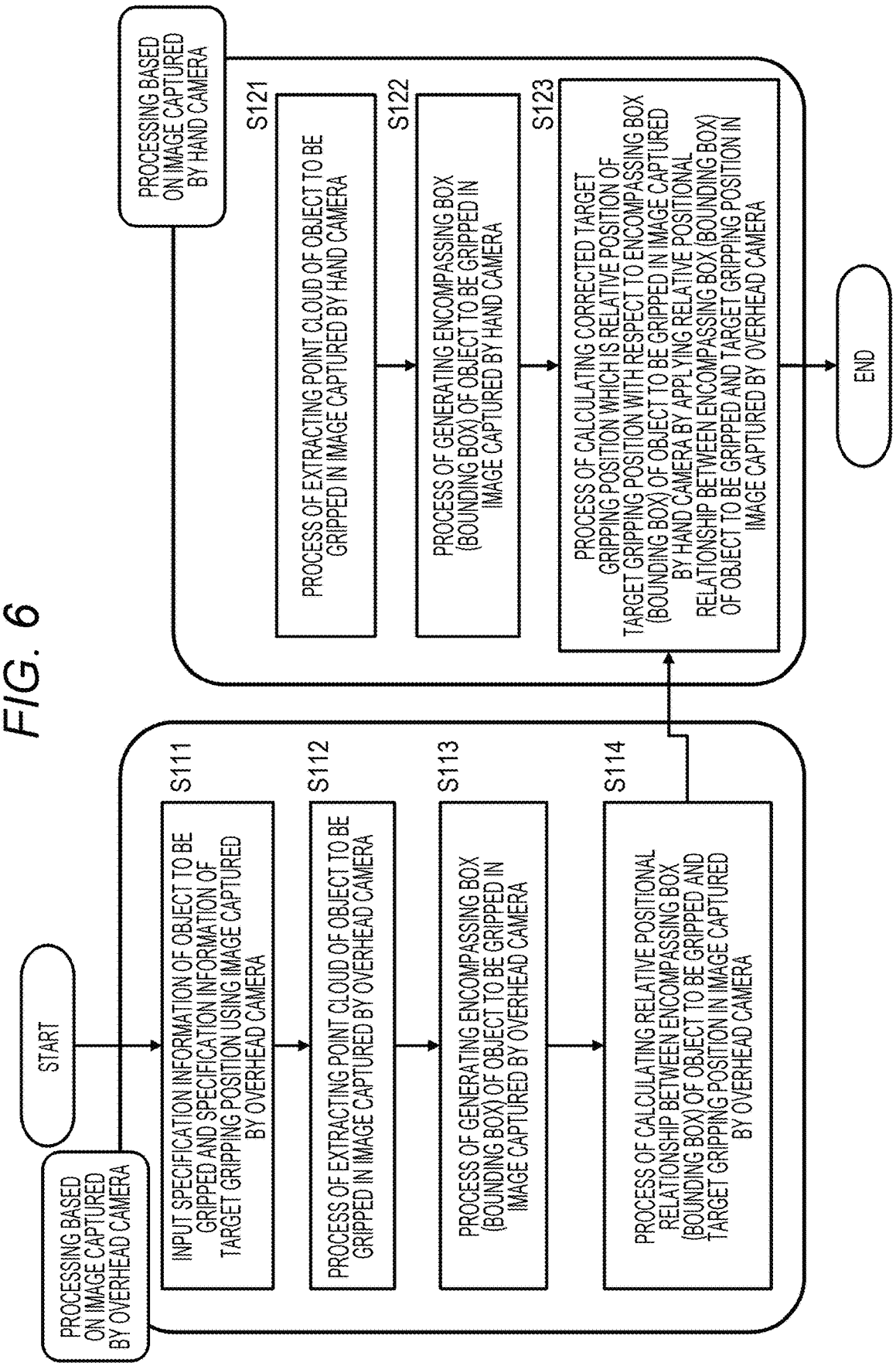
FIG. 6 is a flowchart for describing a sequence of processing executed by the robot control apparatus of the present disclosure.

FIG. 6 is a flowchart for describing a sequence of a process of calculating a gripping position (corrected target gripping position) of an object to be gripped, the process being executed by the data processor 110 of the robot control apparatus 100 illustrated in FIG. 5.

Note that the "corrected target gripping position" is a gripping position at which the object to be gripped included in an image captured by the hand camera can be stably gripped, and is a gripping position that coincides with a target gripping position specified by a user while viewing a bird's-eye view image as described above.

Hereinafter, details of the processing executed by the robot control apparatus 100 of the present disclosure will be described with reference to the flowchart illustrated in FIG. 6.

Note that processing according to a flow illustrated in FIG. 6 is processing that can be executed under the control of a control unit (data processor), which includes a CPU having a program execution function of an information processing apparatus and the like, according to a program stored in a storage unit (memory) of the robot control apparatus 100.

Hereinafter, a process in each step of the flow illustrated in FIG. 6 will be described.

In the flow illustrated in FIG. 6, processes in steps S111 to S114 are processes executed on the basis of an image (including a distance image) captured by the overhead camera 122 of the robot head 120.

On the other hand, processes in steps S121 to S123 in the flow illustrated in FIG. 6 are processes executed on the basis of an image (including a distance image) captured by the hand camera 132 of the robot hand unit 130.

First, the processes in steps S111 to S114 executed on the basis of the image captured by the overhead camera 122 will be described.

(Step S111)

First, the data processor 110 of the robot control apparatus 100 inputs specification information of an object to be gripped using an image captured by the overhead camera and specification information of a target gripping position.

The specification information of the object to be gripped and the specification information of the target gripping position are input by a user while viewing the image captured by the overhead camera using the input/output unit (user terminal) 180, for example.

A specific example of this process will be described with reference to FIG. 7.

Figure 7:
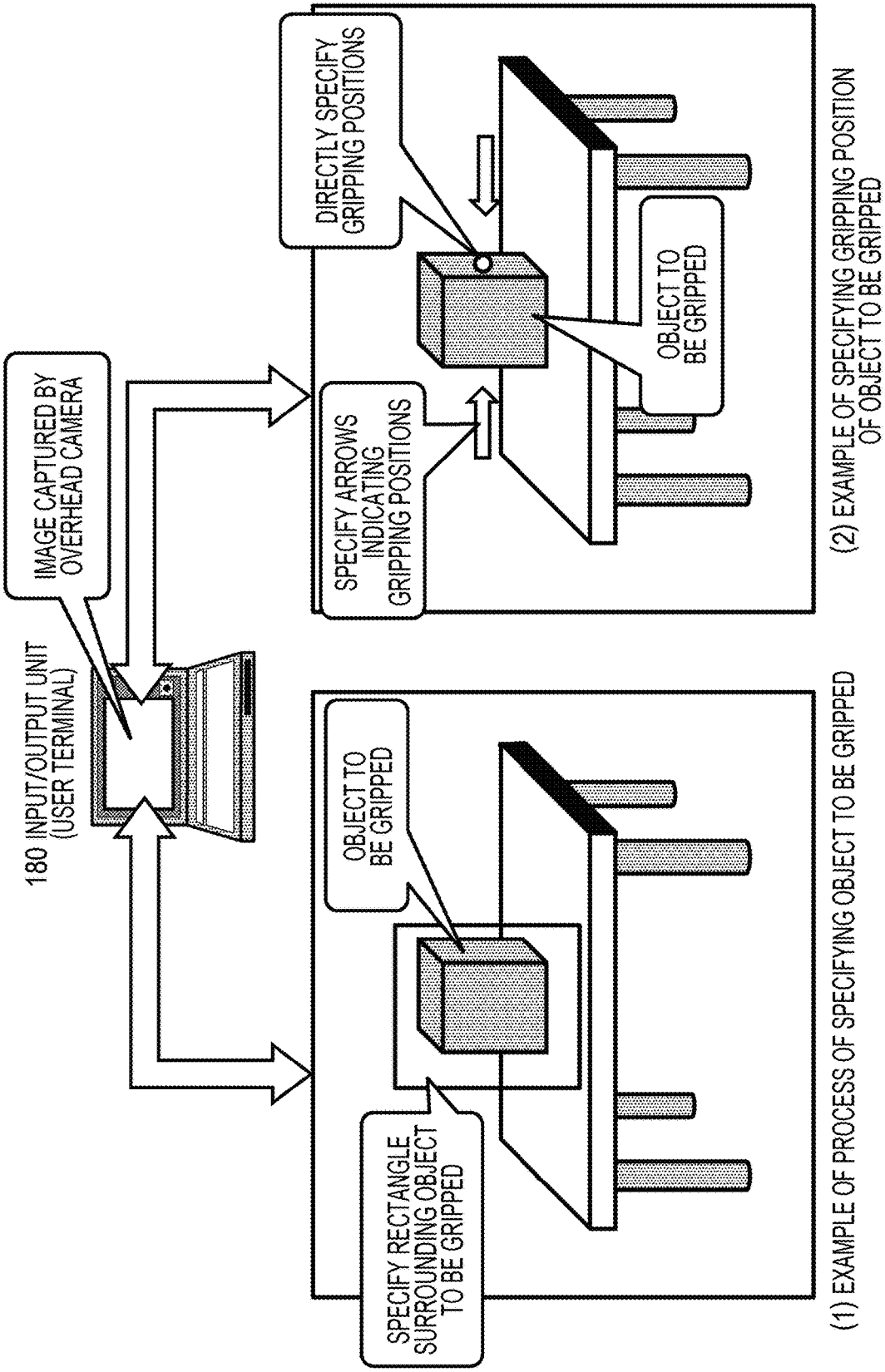
FIG. 7 is a diagram for describing a specific example of a process of inputting specification information of an object to be gripped and specification information of a target gripping position.

FIG. 7 illustrates each of the following drawings.

(1) Example of process of specifying object to be gripped (2) Example of specifying gripping position of object to be gripped Both the drawings illustrated in FIGS. 7(1) and 7(2) represent an image captured by the overhead camera 122 displayed on a display unit of the input/output unit (user terminal) 180.

That is, the image captured by the overhead camera 122 is an image in which an object to be gripped having a rectangular parallelepiped shape is placed on a table.

In this manner, the user inputs specification information of the object to be gripped and specification information of a target gripping position while viewing the image captured by the overhead camera displayed on the input/output unit (user terminal) 180.

FIG. 7(1) illustrates an input example of the specification information of the object to be gripped.

For example, as illustrated in FIG. 7(1), the user specifies the object to be gripped by a technique of setting a rectangular region surrounding the object to be gripped having the rectangular parallelepiped shape or the like.

Moreover, the user specifies a gripping position (target gripping position) for stably gripping the object to be gripped as illustrated in FIG. 7(2).

As a method of specifying the gripping position, there are a method of directly specifying gripping positions on the surface of the object to be gripped and a technique of setting arrows indicating gripping positions as illustrated in the drawing.

In the example illustrated in FIG. 7(2), the gripping positions on the surface of the object to be gripped having the rectangular parallelepiped shape are to be set to substantially center positions of two opposite surfaces on both sides.

Out of the two opposite surfaces on the both sides of the object to be gripped, one surface is at a position that can be observed from the image captured by the overhead camera, and this point enables direct specification of the gripping position on the surface of the object to be gripped.

However, one surface is at a position that is not viewable in the image captured by the overhead camera. In such a case, the user sets arrows indicating the gripping positions as illustrated in the drawing.

Note that a method may be applied in which a three-dimensional image of an object to be gripped is displayed on the display unit, a marker that enables a user to interactively set position information is further displayed on display data, and the user directly specifies a gripping position by moving the marker.

In a case where the user directly specifies the gripping position on the surface of the object to be gripped, the data processor 110 of the robot control apparatus 100 determines the specified position as the target gripping position and stores position information (a three-dimensional position of a relative position with respect to the object to be gripped or the target gripping position) in the storage unit.

Furthermore, in a case where the user does not directly specify the gripping position on the surface of the object to be gripped but sets the arrow, the data processor 110 of the robot control apparatus 100 calculates an intersection between the arrow set by the user and the object to be gripped, determines the intersection as the target gripping position, and stores position information (a three-dimensional position of a relative position with respect to object to be gripped or the target gripping position) in the storage unit.

Note that the gripping position is a point at which the object to be gripped can be stably gripped and lifted by the hand of the robot, and the number of the gripping positions varies depending on a configuration of the hand of the robot. In the present embodiment, the hand of the robot has a gripper type including two rotatable movable portions on the right and left sides, respectively, as described with reference to FIGS. 1 to 4. In this configuration of the gripper-type hand, the two movable portions grip an object to be gripped so as to sandwich the object to be gripped from the right and left sides, and thus, it is only required to set two points at which the two right and left movable portions come into contact with the object to be gripped as gripping positions.

For example, in a case where the hand of the robot has a structure including three fingers, or the like, a process of specifying three points at which the respective fingers come into contact with an object to be gripped as gripping positions is performed.

As illustrated in FIGS. 7(1) and 7(2), when the user inputs the specification information of the object to be gripped and the specification information of the target gripping position while viewing the image captured by the overhead camera displayed on the input/output unit (user terminal) 180, the data processor 110 of the robot control apparatus 100 determines the object to be gripped and the target gripping position on the object to be gripped on the basis of these pieces of input information.

(Step S112)

Next, the process in step S112 of the flow of FIG. 6 will be described.

In step S112, a process of extracting a point cloud of the object to be gripped in the image captured by the overhead camera is executed.

This process is a process executed by the object-to-be-gripped point cloud extraction unit 111 of the data processor 110 of the robot control apparatus 100.

The object-to-be-gripped point cloud extraction unit 111 executes the process of extracting a point cloud (three-dimensional point cloud) indicating the object to be gripped on the basis of the object to be gripped selected from the image captured by the overhead camera 122. The point cloud corresponds to a point cloud (three-dimensional point cloud) indicating an outer shape of an object which is the object to be gripped, that is, a three-dimensional shape of the object.

An example of the process of extracting the three-dimensional point cloud of the object to be gripped, the process being executed by the object-to-be-gripped point cloud extraction unit 111, will be described with reference to FIG. 8.

FIG. 8 illustrates each of the following drawings.
(1) Object to be gripped and object-to-be-gripped specification information
(2) Example of point cloud (three-dimensional point cloud) of object to be gripped FIG. 8(1) illustrates an object to be gripped selected from an image captured by the overhead camera 122 and a rectangular region as specification information of the object to be gripped, the information being specified by the user.

The object-to-be-gripped point cloud extraction unit 111 uses an object in the specified rectangular region as the object to be gripped, and extracts a point cloud corresponding to the object.

Note that, initially, a point cloud is generated for the entire object region in the image. Therefore, the object-to-be-gripped point cloud extraction unit 111 needs to perform a process of removing a point cloud other than a point cloud related to the object to be gripped included in the rectangular region specified by the user.

For example, if there is a point cloud corresponding to an object on a support plane (table or the like) of the object to be gripped, the point cloud corresponding to the support plane (table) is removed.

As a technique for removing a point cloud corresponding to an object other than the object to be gripped and extracting only the point cloud corresponding to the object to be gripped, for example, a clustering process of classifying point clouds in units of individual objects is effective.

Point clouds are divided into clusters in units of objects, and thereafter, a point cloud constituted by clusters including the largest number of clusters in the rectangular region, which is the specified region of the object to be gripped set by the user, is extracted as the point cloud corresponding to the object to be gripped. The other point cloud clusters are point clouds of objects other than the object to be gripped, and thus, are deleted.

Since such processing is performed, the point cloud (three-dimensional point cloud) of the object to be gripped, for example, as illustrated in FIG. 8(2) can be extracted.

Note that an existing technique, such as a RANSAC technique, can be applied to a process of detecting a support plane such as a table on which the object to be gripped is placed. Furthermore, for clustering, an existing technique, such as Euclidean clustering, can be applied.

(Step S113)

Next, the process in step S113 of the flow of FIG. 6 will be described.

In step S113, a process of generating an encompassing box (bounding box) of the object to be gripped in the image captured by the overhead camera is performed.

This process is executed by the object-to-be-gripped encompassing box generation unit 112 of the data processor 110 of the robot control apparatus 100.

The object-to-be-gripped encompassing box generation unit 112 generates an "object-to-be-gripped encompassing box" that encompasses a three-dimensional point cloud on the basis of the three-dimensional point cloud of an object to be gripped generated by the object-to-be-gripped point cloud extraction unit 111.

As described above, a shape of the "object-to-be-gripped encompassing box" is not particularly limited and may be various shapes such as a rectangular parallelepiped, a cylinder, a cone, and a torus. In the present embodiment, however, an example in which a bounding box having a rectangular parallelepiped shape is used as the "object-to-be-gripped encompassing box" will be described.

A detailed sequence of the process in step S113, that is, the process of generating an encompassing box (bounding box) of the object to be gripped in the image captured by the overhead camera, the process being executed by the object-to-be-gripped encompassing box generation unit 112, will be described with reference to a flow illustrated in FIG. 9 and FIG. 10.

A process in each step of the flow illustrated in FIG. 9 will be described.
(Step S201)

First, in step S201, the object-to-be-gripped encompassing box generation unit 112 inputs each piece of the following information.
 (a) Object-to-be-gripped point cloud based on overhead camera
 (b) Target gripping positions The object-to-be-gripped point cloud based on the overhead camera of (a) is point cloud data generated by the object-to-be-gripped point cloud extraction unit 111, and is input from the object-to-be-gripped point cloud extraction unit 111.

The target gripping position of (b) is a target gripping position input by the user and is the target gripping position input by the user in step S111 of the flow of FIG. 6.
(Step S302)

Next, in step S302, the object-to-be-gripped encompassing box generation unit 112 performs a process of setting one side of an encompassing box (bounding box) to be parallel to a vertical plane (yz plane) which is perpendicular to an approach direction (x direction) of the target gripping position.

This process will be described with reference to FIG. 10(1).

Figure 10:
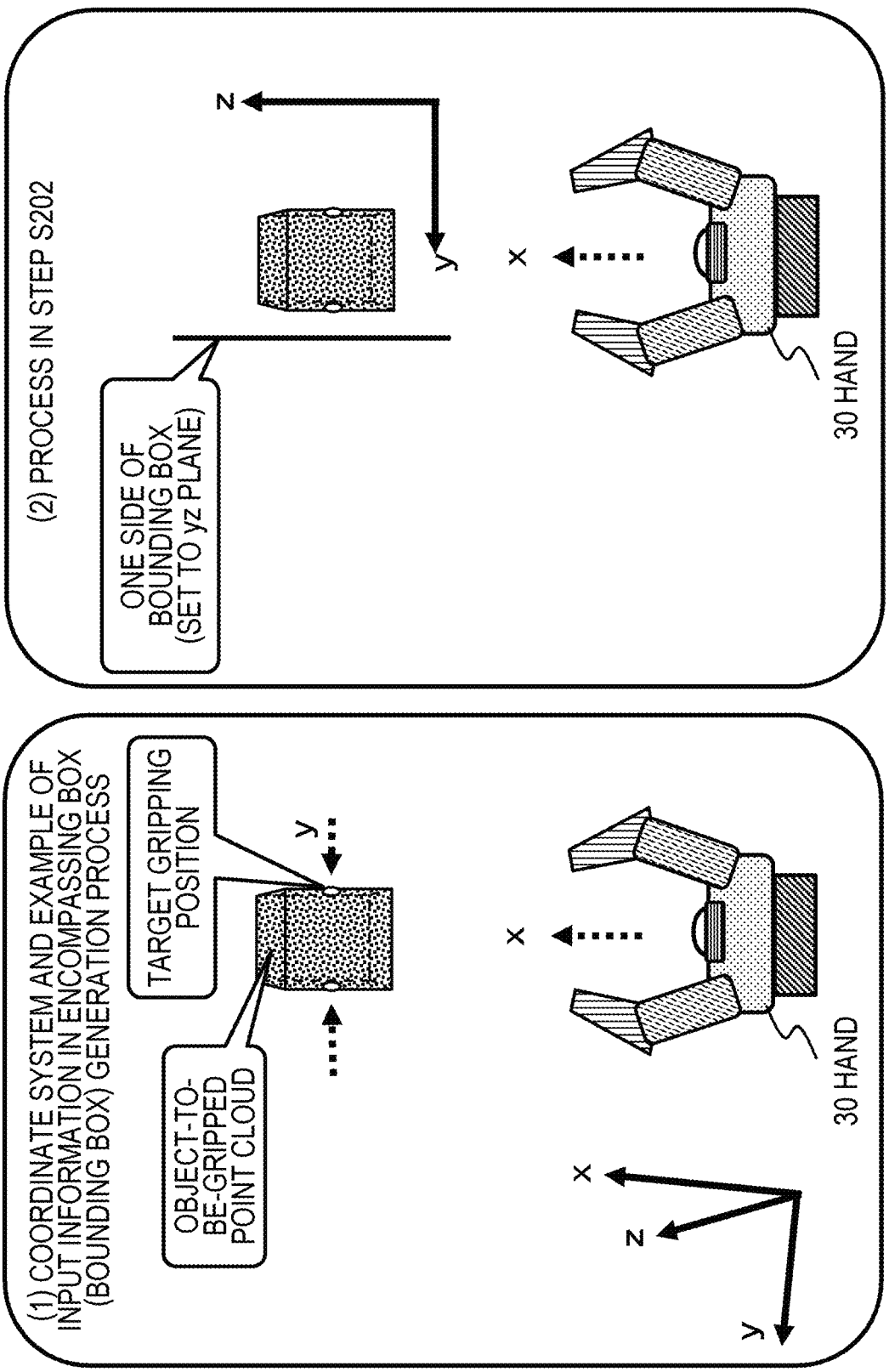
FIG. 10 is a diagram for describing a specific example of the encompassing box (bounding box) generation process.

FIG. 10(1) illustrates a coordinate system and an example of input information in the encompassing box (bounding box) generation process.

In the coordinate system, an approach direction that is a direction in which the hand 30 approaches the object 50 as the object to be gripped is set as an x direction, and a movement direction, which is perpendicular to the x direction and in which the movable portions of the hand 30 are brought close to target gripping positions in the gripping process of the hand 30, is set as a y axis. Moreover, it is a right-handed coordinate system in which a direction perpendicular to an x axis and the y axis is set as a z axis.

In step S202, the process of setting one side of an encompassing box (bounding box) to be parallel to the vertical plane (yz plane) which is perpendicular to the approach direction (x direction) of the target gripping positions is performed.

A specific example is illustrated in FIG. 10(2). As illustrated in FIG. 10(2), a side parallel to the vertical plane (yz plane) perpendicular to the approach direction (x direction) of the target gripping positions is set as one side of an encompassing box (bounding box).

Four sides are set as above so that a surface of the bounding box having a rectangular parallelepiped shape is defined. However, various bounding boxes, for example, as illustrated in FIGS. 11(2a) and 11(2b) can be generated as the bounding box having the sides parallel to the yz plane.

FIG. 11(2a) is a generation example of an undesirable bounding box, and FIG. 11(2b) is a generation example of a desirable bounding box.

In step S202, the object-to-be-gripped encompassing box generation unit 112 further sets one surface of the bounding box to face the hand 30 in the approach direction (x direction) as illustrated in FIG. 11(2b).

That is, the rotation (yaw angle) about the z axis of the bounding box having the side parallel to the yz plane is adjusted to set one surface of the bounding box to face the hand 30 in the approach direction (x direction).
(Step S203)

Next, in step S203, the object-to-be-gripped encompassing box generation unit 112 determines whether or not there is a support plane of the object to be gripped.

The support plane is, for example, a plane such as a table on which the object to be gripped is placed.

In a case where the support plane of the object to be gripped exists, the processing proceeds to step S204.

On the other hand, in a case where the support plane of the object to be gripped does not exist, the processing proceeds to step S211.
(Step S204)

In the case where it is determined in step S203 that the support plane of the object to be gripped exists, the processing proceeds to step S204.

In step S204, the object-to-be-gripped encompassing box generation unit 112 sets one surface of an encompassing box (bounding box) on the support plane to generate the encompassing box (bounding box).

This process in step S204 will be described with reference to FIG. 12. An example illustrated in FIG. 12(3a) illustrates a state in which the object to be gripped is placed on a table that is the support plane.

Figure 12:
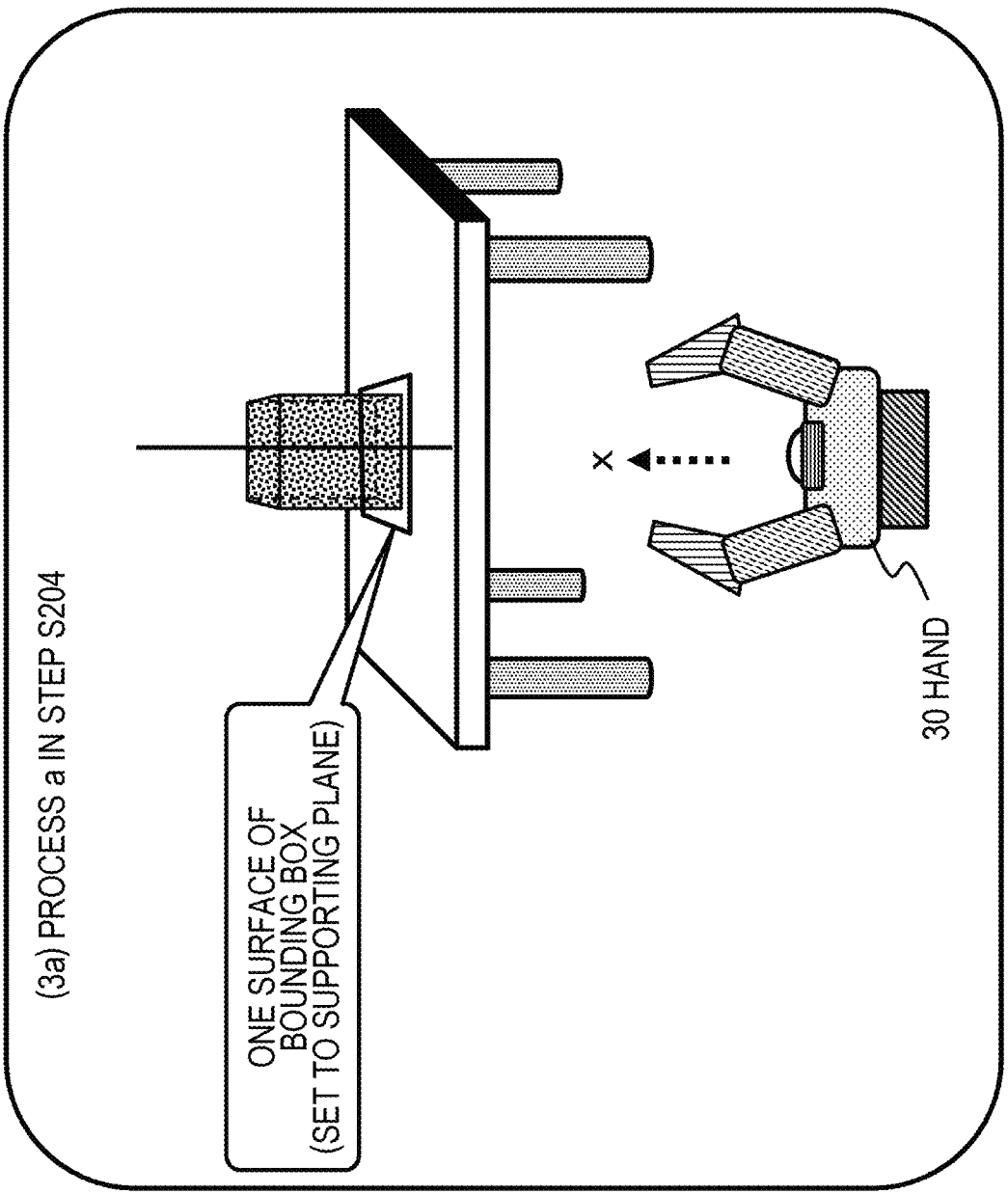
FIG. 12 is a diagram for describing a specific example of the encompassing box (bounding box) generation process.

In step S204, the object-to-be-gripped encompassing box generation unit 112 sets one surface of an encompassing box (bounding box) on the support plane (table) as illustrated in FIG. 12(3a).

Moreover, the encompassing box (bounding box) is generated by connecting the surface set on the support plane (table) to the sides generated in step S202, that is, the sides set to be parallel to the vertical plane (yz plane), perpendicular to the approach direction (x direction) of the target gripping positions described above with reference to FIGS. 10(2) and 11(2b).

Figure 13:
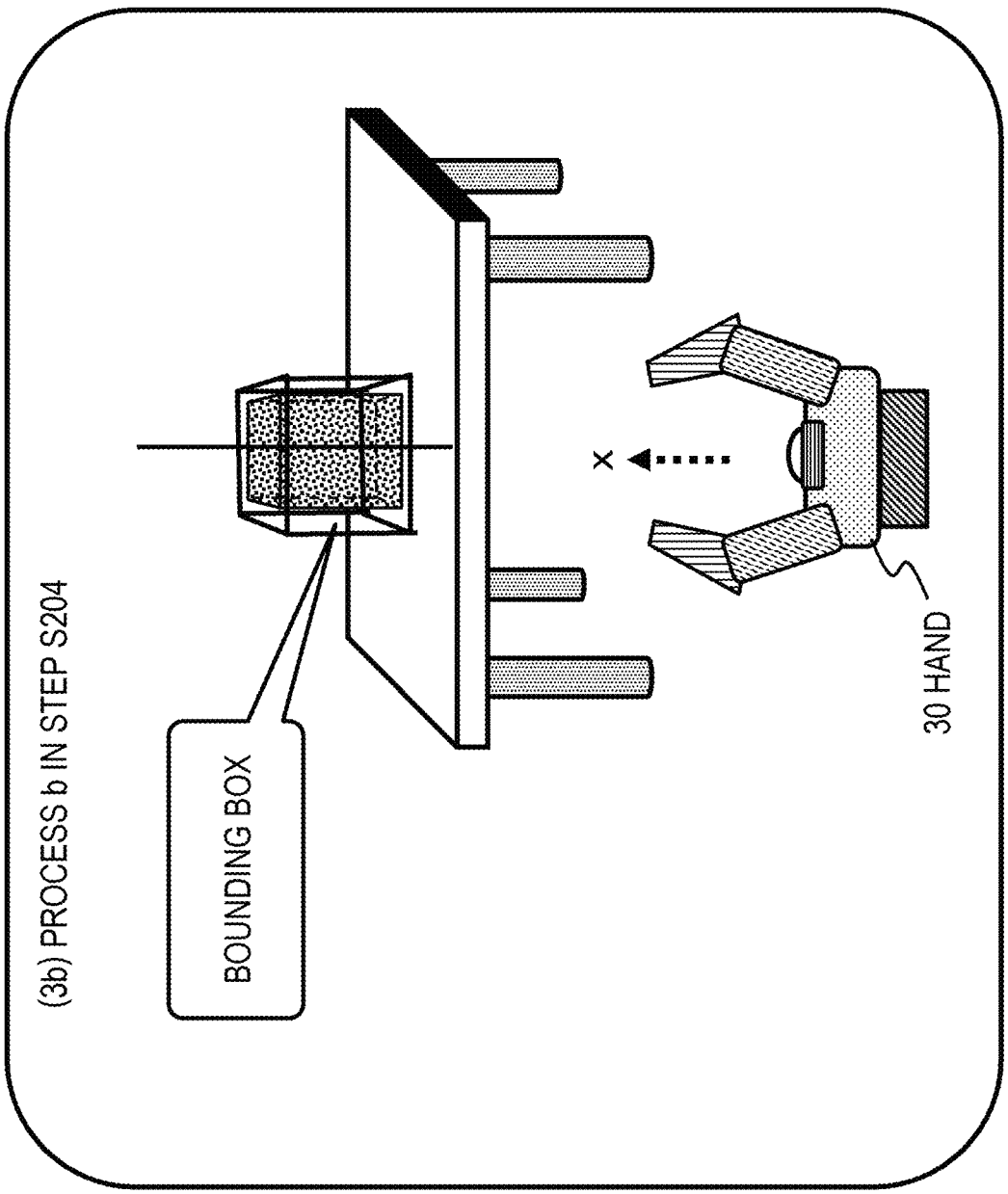
FIG. 13 is a diagram for describing a specific example of the encompassing box (bounding box) generation process.

As a result, for example, an encompassing box (bounding box) illustrated in FIG. 13(3b) is generated.
(Step S211)

On the other hand, in the case where it is determined in step S203 that the support plane of the object to be gripped does not exist, the processing proceeds to step S211.

In step S211, the object-to-be-gripped encompassing box generation unit 112 projects the object-to-be-gripped point cloud onto a vertical plane (zx plane) parallel to an approach direction (y direction) of the target gripping positions, and uses this projection plane as a constituent plane of an encompassing box (bounding box).

A specific example of this process will be described with reference to FIG. 14(4).

Figure 14:
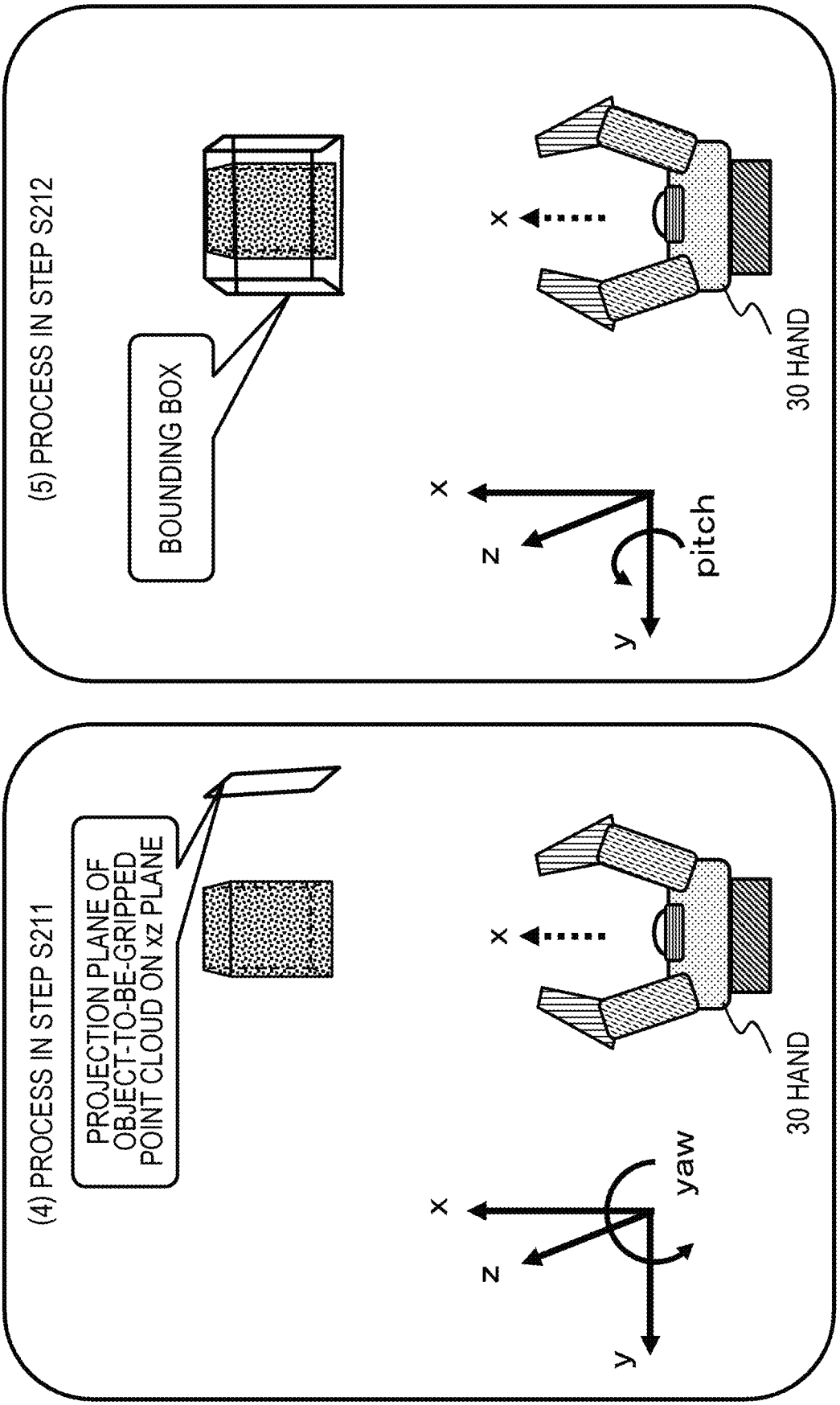
FIG. 14 is a diagram for describing a specific example of the encompassing box (bounding box) generation process.

As illustrated in FIG. 14(4), the object-to-be-gripped encompassing box generation unit 112 projects the object-to-be-gripped point cloud onto the vertical plane (zx plane) parallel to the approach direction (y direction) of the target gripping positions, and uses this projection plane as the constituent plane of the encompassing box (bounding box).

The projection plane generated by this projection process is a "projection plane of the object-to-be-gripped point cloud on the xz plane" illustrated in FIG. 14(4).

(Step S212)

Next, in step S212, the object-to-be-gripped encompassing box generation unit 112 executes two-dimensional principal component analysis on the projected point cloud to determine an attitude of the encompassing box (bounding box) around a pitch axis (the y axis).

The object-to-be-gripped point cloud projected onto the xz plane is a point cloud obtained by projecting a point cloud, which is originally spread in a three-dimensional space of the object to be gripped having a three-dimensional shape, onto a two-dimensional plane (the xz plane).

The two-dimensional principal component analysis is executed on the point cloud deployed on the two-dimensional plane, so that it is possible to determine the encompassing box (bounding box) having a shape that encompasses the object to be gripped having the three-dimensional shape. Specifically, the attitude around the pitch axis (y axis) of the encompassing box (bounding box) is determined by the two-dimensional principal component analysis on the projected point cloud.

Through this process, for example, an encompassing box (bounding box) illustrated in FIG. 14(5) can be generated.

Note that three-axis principal component analysis may be directly applied, instead of the two-dimensional principal component analysis on the projected point cloud.

Furthermore, since the three-dimensional position information of the target gripping position is available, a more precise encompassing box (bounding box) generation process is implemented by generating an encompassing box (bounding box) such that three-dimensional positions of the target gripping positions are included in the encompassing box (bounding box).

The description has been given so far regarding the process in step S113 of the flow illustrated in FIG. 6, that is, details of the process of generating an encompassing box (bounding box) of the object to be gripped in the image captured by the overhead camera, the process being executed by the object-to-be-gripped encompassing box generation unit 112.

As described above, the object-to-be-gripped encompassing box generation unit 112 generates the "object-to-be-gripped encompassing box (bounding box)" that encompasses the three-dimensional point cloud of the object to be gripped on the basis of the three-dimensional point cloud of the object to be gripped generated by the object-to-be-gripped point cloud extraction unit 111.

Next, the process in step S114 of the flow of FIG. 6 will be described.

(Step S114)

In step S114, a process of calculating a relative positional relationship between the encompassing box (bounding box) of the object to be gripped in the image captured by the overhead camera and the target gripping position is executed.

This process is a process executed by the gripping position calculation unit 113 of the data processor 110 of the robot control apparatus 100.

The gripping position calculation unit 113 executes the process of calculating a relative positional relationship between the object-to-be-gripped encompassing box (bounding box) of the object to be gripped in the image captured by the overhead camera and the target gripping position.

Note that the target gripping position is, for example, the gripping position set by the user while viewing the image captured by the overhead camera using the input/output unit (user terminal) 180, and is the gripping position for which the user has determined that the object to be gripped can be stably gripped by the hand of the robot as described above.

This process in step S114 will be described with reference to FIG. 15.

Figure 15:
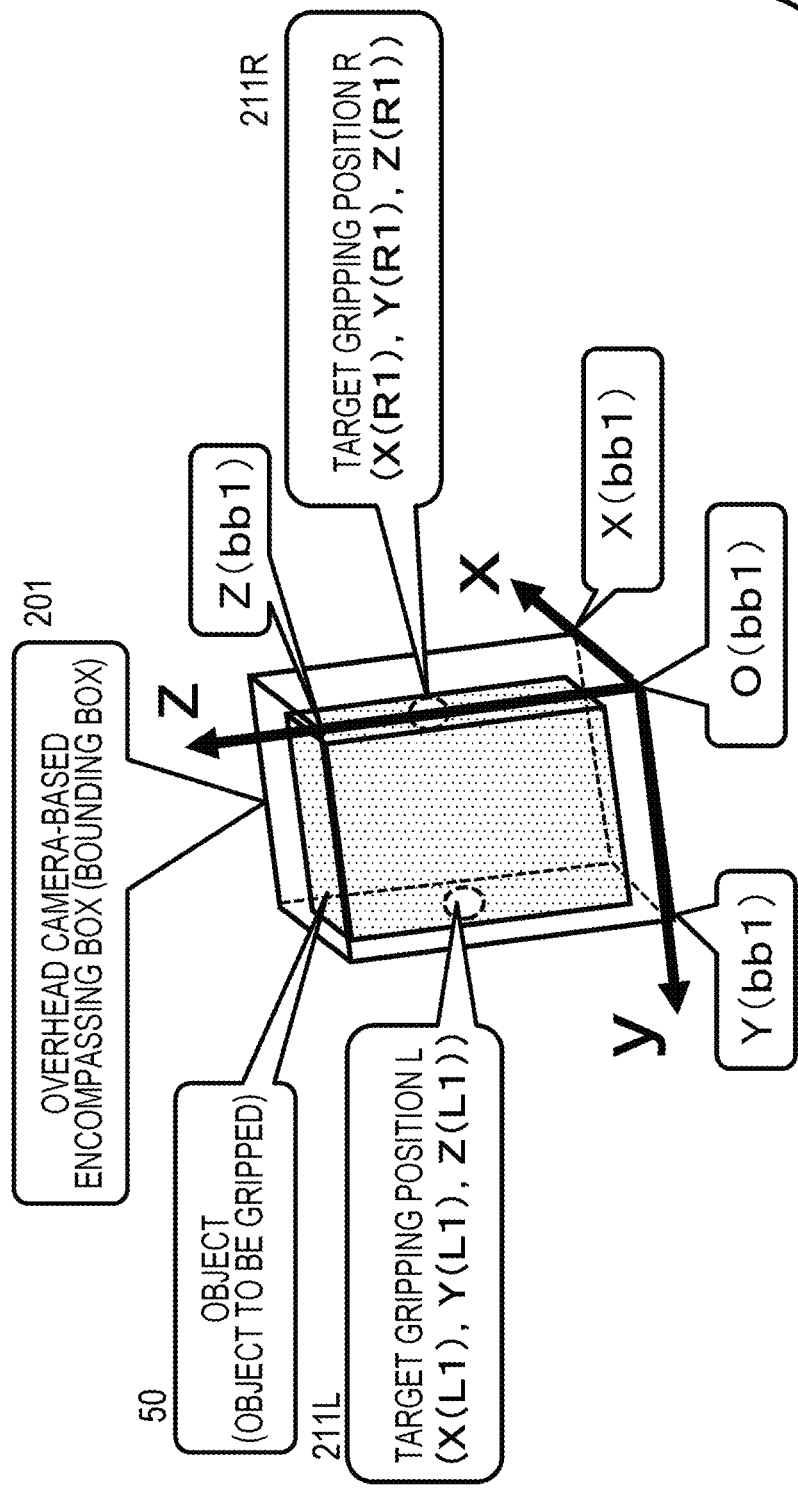
FIG. 15 is a diagram for describing a specific example of a relative relationship calculation process between an overhead camera-based encompassing box (bounding box) and a target gripping position.

FIG. 15 illustrates the object 50, which is the object to be gripped, and an overhead camera-based encompassing box (bounding box) 201 that encompasses the object 50 generated by the object-to-be-gripped encompassing box generation unit 112 in step S113 of the flow illustrated in FIG. 6.

The overhead camera-based encompassing box (bounding box) 201 is the encompassing box (bounding box) generated on the basis of the image captured by the overhead camera 122.

The gripping position calculation unit 113 generates a coordinate system (overhead camera-based encompassing box coordinate system) with one vertex of the overhead camera-based encompassing box (bounding box) 201 as an origin.

As illustrated in FIG. 15, the overhead camera-based encompassing box coordinate system is a coordinate system in which sides of the overhead camera-based encompassing box (bounding box) 201 having a rectangular parallelepiped shape are set as X, Y, and Z axes, respectively, with one vertex of the encompassing box (bounding box) 201 as an origin (O(bb1)).

The overhead camera-based encompassing box (bounding box) 201 is defined as a rectangular parallelepiped having, as vertices, four points of the origin (O(bb1)) on the overhead camera-based encompassing box coordinate system, a point (X(bb1)) on the X axis, a point (Y(bb1)) on the Y axis, and a point (Z(bb1)) on the Z axis.

Moreover, FIG. 15 illustrates three-dimensional position coordinates of the target gripping positions in the overhead camera-based encompassing box coordinate system. The following two points are illustrated in FIG. 15.

Target gripping position L ((X(L1), Y(L1), Z(L1)), 211L
Target gripping position R (X(R1), Y(R1), Z(R1)), 211R
These two points are applied.

Note that the target gripping positions are the target gripping positions set by the user while viewing the image captured by the overhead camera using, for example, the input/output unit (user terminal) 180 as described above.

In step S114, the gripping position calculation unit 113 calculates the target gripping positions set by the user as three-dimensional positions on the coordinate system (overhead camera-based encompassing box coordinate system) illustrated in FIG. 15. That is, three-dimensional position coordinates of the following two points illustrated in FIG. 15 are calculated.

Target gripping position L ((X(L1), Y(L1), Z(L1)), 211L
Target gripping position R (X(R1), Y(R1), Z(R1)), 211R
These coordinates of the target gripping positions are coordinates in the coordinate system in which sides of the overhead camera-based encompassing box (bounding box) 201 having the rectangular parallelepiped shape are set as the X, Y, and Z axes, respectively, with one vertex of the encompassing box (bounding box) as the origin.

Therefore, the coordinates of the target gripping position illustrated in FIG. 15 are coordinates indicating the relative positional relationship between the encompassing box (bounding box) of the object to be gripped in the image captured by the overhead camera and the target gripping position.

In this manner, in step S114, as the process of calculating a relative positional relationship between the object-to-be-gripped encompassing box (bounding box) of the object to be gripped in the image captured by the overhead camera and the target gripping position, the gripping position calculation unit 113 executes a process of calculating three-dimensional positions of the target gripping positions on the coordinate system (overhead camera-based encompassing box coordinate system) illustrated in FIG. 15, that is, the following positions:

Target gripping position L ((X(L1), Y(L1), Z(L1)), 211L; and

Target gripping position R (X(R1), Y(R1), Z(R1)), 211R.

Next, the processes in steps S121 to S123 illustrated FIG. 6 will be described.

The processes in steps S121 to S123 are executed on the basis of the image captured by the hand camera 132 of the robot hand unit 130.

(Step S121)

In step S121, a process of extracting a point cloud of the object to be gripped in the image captured by the hand camera is executed.

This process is a process executed by the object-to-be-gripped point cloud extraction unit 111 of the data processor 110 of the robot control apparatus 100.

The object-to-be-gripped point cloud extraction unit 111 extracts a point cloud (three-dimensional point cloud) indicating the object to be gripped included in the image captured by the hand camera 132. As described above, the point cloud corresponds to a point cloud (three-dimensional point cloud) indicating an outer shape of an object as the object to be gripped, that is, a three-dimensional shape of the object.

That is, the point cloud (three-dimensional point cloud) of the object to be gripped as illustrated in FIG. 8(2) is generated as described above with reference to FIG. 8.

Note that the point cloud extraction using the rectangular region that specifies the object to be gripped specified by the user is performed in the processing described above with reference to FIG. 8.

In the process of extracting the object to be gripped from the image captured by the hand camera 132 as well, the similar processing may be performed by displaying the image captured by the hand camera 132 on the input/output unit (user terminal) 180 to allow the user to specify the object to be gripped and set a rectangular region, but it is also possible to perform the processing without such specification of the rectangular region performed by the user.

That is, the process of extracting the object to be gripped from the image captured by the hand camera 132 can be autonomously executed with reference to a shape and a size of an encompassing box (bounding box) generated on the basis of the image captured by the overhead camera 122.

Specifically, for example, the process of extracting the object to be gripped is executed by applying a min-cut based segmentation process known as a processing technique for extracting a specific object from an image. That is, the process of extracting the object to be gripped from the image captured by the hand camera 132 is executed by applying a method of performing foreground extraction by setting a point serving as a seed and a size to a point cloud and a size included in an overhead camera-based encompassing box (bounding box) by the min-cut based segmentation process.

At the time of this process, a process such as a process of detecting a support plane such as a table on which the object to be gripped is placed or clustering may be added as necessary.

As described above, an existing technique, such as a RANSAC technique, can be applied to the process of detecting the support plane such as the table on which the object to be gripped is placed. Furthermore, for clustering, an existing technique, such as Euclidean clustering, can be applied.

Note that, in a case where a size of an extracted point cloud based on the hand camera 132 acquired by this process is greatly different from the overhead camera-based encompassing box (bounding box) generated in step S113, it is preferable to execute processing such as changing a parameter again to change a point cloud to be extracted.

By performing such processing, for example, the point cloud (three-dimensional point cloud) of the object to be gripped as illustrated in FIG. 8(2) can be extracted as the point cloud (three-dimensional point cloud) indicating the object to be gripped included in the image captured by the hand camera 132.

(Step S122)

Next, the process in step S122 of the flow of FIG. 6 will be described.

In step S122, a process of generating an encompassing box (bounding box) of the object to be gripped in the image captured by the hand camera is performed.

This process is executed by the object-to-be-gripped encompassing box generation unit 112 of the data processor 110 of the robot control apparatus 100.

The object-to-be-gripped encompassing box generation unit 112 generates an "object-to-be-gripped encompassing box" that encompasses a three-dimensional point cloud on the basis of the three-dimensional point cloud of the object to be gripped in the image captured by the hand camera 132 generated by the object-to-be-gripped point cloud extraction unit 111.

Note that the encompassing box generated by the object-to-be-gripped encompassing box generation unit 112, that is, the encompassing box that encompasses the object to be gripped in the image captured by the hand camera is an encompassing box having the same shape as the encompassing box previously generated in step S113.

Although a shape of the "object-to-be-gripped encompassing box" is not particularly limited and may be various shapes, such as a rectangular parallelepiped, a cylinder, a cone, and a torus, as described above, the "object-to-be-gripped encompassing box" previously generated in step S113 is the bounding box having the rectangular parallelepiped shape, and a bounding box having a rectangular parallelepiped shape is generated in step S122 as well.

Figure 16:
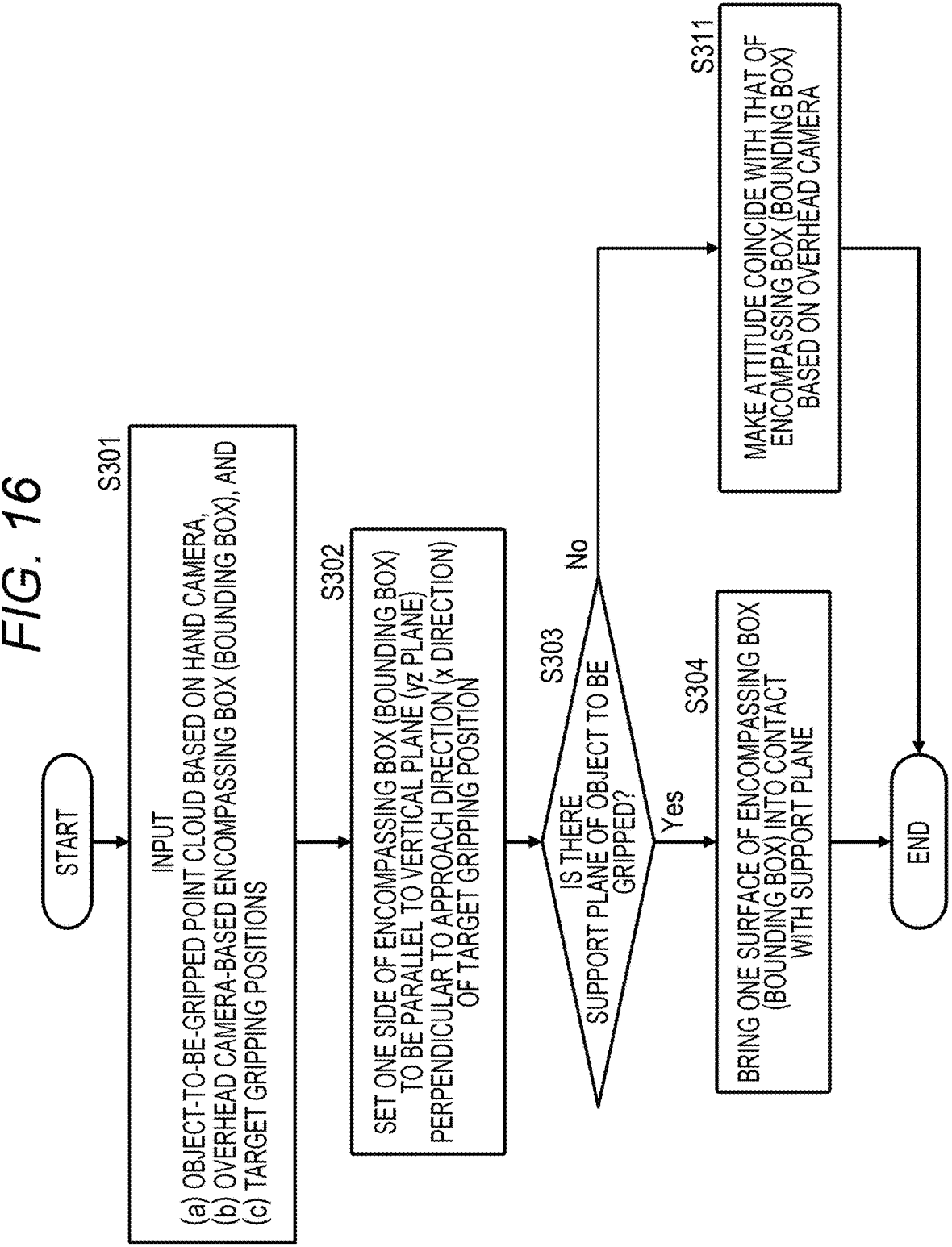
FIG. 16 is a flowchart for describing a sequence of an encompassing box (bounding box) generation process which is executed by the robot control apparatus of the present disclosure and to which an image captured by a hand camera is applied.

A detailed sequence of the process in step S122, that is, the process of generating an encompassing box (bounding box) of the object to be gripped in the image captured by the hand camera, the process being executed by the object-to-be-gripped encompassing box generation unit 112, will be described with reference to a flow illustrated in FIG. 16.

A process in each step of the flow illustrated in FIG. 16 will be described.

(Step S301)

First, in step S301, the object-to-be-gripped encompassing box generation unit 112 inputs each piece of the following information.

(a) Object-to-be-gripped point cloud based on hand camera
(b) Overhead camera-based encompassing box (bounding box)
(c) Target gripping positions The object-to-be-gripped point cloud based on the hand camera of (a) is point cloud data generated in step S121 by the object-to-be-gripped point cloud extraction unit 111 on the basis of the image captured by the hand camera, and is input from the object-to-be-gripped point cloud extraction unit 111.

The overhead camera-based encompassing box (bounding box) of (b) is the encompassing box (bounding box) generated in step S113 of the flow of FIG. 6, and is input from an object-to-be-gripped point encompassing box generation unit 112.

The target gripping positions of (c) are the target gripping positions input by the user in step S111 of the flow of FIG. 6.

(Step S302)
Next, in step S302, the object-to-be-gripped encompassing box generation unit 112 performs a process of setting one side of an encompassing box (bounding box) to be parallel to a vertical plane (yz plane) which is perpendicular to an approach direction (x direction) of the target gripping position.

Figure 9:
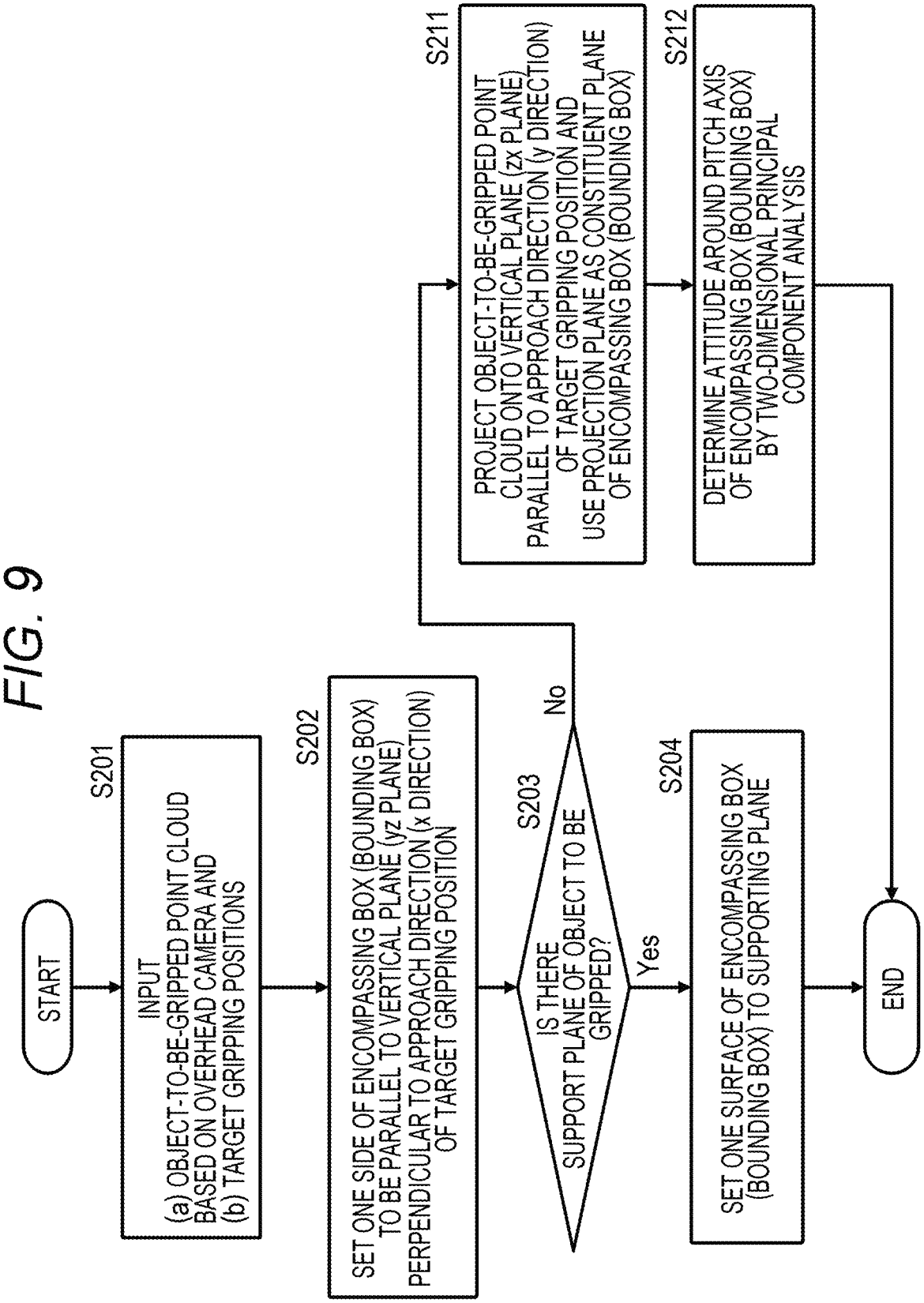
FIG. 9 is a flowchart for describing a sequence of an encompassing box (bounding box) generation process which is executed by the robot control apparatus of the present disclosure and to which an image captured by an overhead camera is applied.

This process is a process similar to the process in step S202 of the flow of FIG. 9 described above.

That is, this process is the process described above with reference to FIGS. 10 and 11.

In step S302, a process of setting one side of the encompassing box (bounding box) to be parallel to a vertical plane (yz plane) perpendicular to the approach direction (x direction) of the target gripping positions is performed.

Specifically, as illustrated in FIG. 10(2), a side parallel to the vertical plane (yz plane) perpendicular to the approach direction (x direction) of the target gripping positions is set as one side of an encompassing box (bounding box).

Four sides are set as above so that a surface of the bounding box having a rectangular parallelepiped shape is defined. However, various bounding boxes, for example, as illustrated in FIGS. 11(2a) and 11(2b) can be generated as the bounding box having the sides parallel to the yz plane.

FIG. 11(2a) is a generation example of an undesirable bounding box, and FIG. 11(2b) is a generation example of a desirable bounding box.

In step S202, the object-to-be-gripped encompassing box generation unit 112 further sets one surface of the bounding box to face the hand 30 in the approach direction (x direction) as illustrated in FIG. 11(2b).

That is, the rotation (yaw angle) about the z axis of the bounding box having the side parallel to the yz plane is adjusted to set one surface of the bounding box to face the hand 30 in the approach direction (x direction).

(Step S303)
Next, in step S303, the object-to-be-gripped encompassing box generation unit 112 determines whether or not there is a support plane of the object to be gripped.

The support plane is, for example, a plane such as a table on which the object to be gripped is placed.

In a case where the support plane of the object to be gripped exists, the processing proceeds to step S304.

On the other hand, in a case where the support plane of the object to be gripped does not exist, the processing proceeds to step S311.

(Step S304)
In the case where it is determined in step S303 that the support plane of the object to be gripped exists, the processing proceeds to step S304.

In step S304, the object-to-be-gripped encompassing box generation unit 112 sets one surface of an encompassing box (bounding box) on the support plane to generate the encompassing box (bounding box).

This process in step S304 is a process similar to the process in step S204 of the flow of FIG. 9 described above.

That is, this process is the process described above with reference to FIGS. 12 and 13.

An example illustrated in FIG. 12(3a) illustrates a state in which the object to be gripped is placed on a table that is the support plane.

In step S304, the object-to-be-gripped encompassing box generation unit 112 sets one surface of an encompassing box (bounding box) on the support plane (table) as illustrated in FIG. 12(3a).

Moreover, the encompassing box (bounding box) is generated by connecting the surface set on the support plane (table) to the sides generated in step S302, that is, the sides set to be parallel to the vertical plane (yz plane), perpendicular to the approach direction (x direction) of the target gripping positions described above with reference to FIGS. 10(2) and 11(2b).

As a result, for example, an encompassing box (bounding box) illustrated in FIG. 13(3b) is generated.

(Step S311)
On the other hand, in the case where it is determined in step S303 that the support plane of the object to be gripped does not exist, the processing proceeds to step S311.

In step S311, the object-to-be-gripped encompassing box generation unit 112 sets an encompassing box (bounding box) having the same attitude as the encompassing box (bounding box) based on the image captured by the overhead camera 122, which has been already generated, as the encompassing box (bounding box) based on the image captured by the hand camera 132.

That is, the encompassing box (bounding box) having the same attitude as the encompassing box (bounding box) based on the image captured by the overhead camera 122 generated in step S113 of the flow illustrated in FIG. 6 is set as the encompassing box (bounding box) based on the image captured by the hand camera 132.

Next, the process in step S123 of the flow of FIG. 6 will be described.

(Step S123)
In step S123, a process of calculating a corrected target gripping position, which is a relative position of the target gripping position with respect to the encompassing box (bounding box) of the object to be gripped in the image captured by the hand camera, is executed by applying a relative positional relationship between the target gripping position and the encompassing box (bounding box) of the object to be gripped in the image captured by the overhead camera.

That is, a relative position of the target gripping position of the object to be gripped with respect to the encompassing box (bounding box) of the object to be gripped in the image captured by the overhead camera is calculated, a target gripping position with respect to a hand camera-based encompassing box in the image captured by the hand camera is calculated on the basis of the calculated relative position, and the calculated position is set as the corrected target gripping position of the object to be gripped included in the image captured by the hand camera.

This process is a process executed by the gripping position calculation unit 113 of the data processor 110 of the robot control apparatus 100 illustrated in FIG. 5.

The gripping position calculation unit 113 executes the process of calculating a corrected target gripping position, which is a relative position of the target gripping position with respect to the encompassing box (bounding box) of the object to be gripped in the image captured by the hand camera, by applying the relative positional relationship between the target gripping position and the encompassing box (bounding box) of the object to be gripped in the image captured by the overhead camera.

Note that the target gripping position is, for example, the gripping position set by the user while viewing the image captured by the overhead camera using the input/output unit (user terminal) 180, and is the gripping position for which the user has determined that the object to be gripped can be stably gripped by the hand of the robot as described above.

The relative position between the encompassing box (bounding box) of the object to be gripped in the image captured by the overhead camera and the target gripping position has been calculated in step 114 of the flow illustrated in FIG. 6, which is processing also based on the image captured by the overhead camera 122 described above with reference to FIG. 15.

In step S123, the relative positional relationship between the encompassing box (bounding box) of the object to be gripped in the image captured by the overhead camera and the target gripping position is used to calculate which position the target gripping position in the image captured by the overhead camera is located at with respect to the encompassing box (bounding box) of the object to be gripped in the image captured by the hand camera.

That is, the process of calculating a corrected target gripping position, which is a relative position of the target gripping position with respect to the encompassing box (bounding box) of the object to be gripped in the image captured by the hand camera, is executed.

In step S123, the gripping position calculation unit 113 generates the following two object-to-be-gripped encompassing boxes (bounding boxes) of the object to be gripped in the images captured by different cameras, that is, (a) the object-to-be-gripped encompassing box (bounding box) of the object to be gripped in the image captured by the overhead camera 122, and (b) the object-to-be-gripped encompassing box (bounding box) of the object to be gripped in the image captured by the hand camera 132, and makes a relative position between each of the encompassing boxes (bounding boxes) and each of gripping positions consistent, thereby calculating which position of the object to be gripped included in the image captured by the hand camera the target gripping position set by the user corresponds to.

This calculated position is defined as a corrected target gripping position.

The corrected target gripping positions in the image captured by the hand camera 132 set by this process are positions respectively corresponding to the target gripping positions set by the user while viewing the image captured by the overhead camera 122.

Therefore, the robot control apparatus 100 can stably grip the object 50 by observing the image captured by the hand camera 132 and bringing a gripper of the hand into contact with the corrected target gripping positions, which are the relative positions of the target gripping positions with respect to the encompassing box (bounding box) of the object to be gripped in the image captured by the hand camera, to perform the process of gripping the object 50.

This process in step S123 will be described with reference to FIG. 17.

Figure 17:
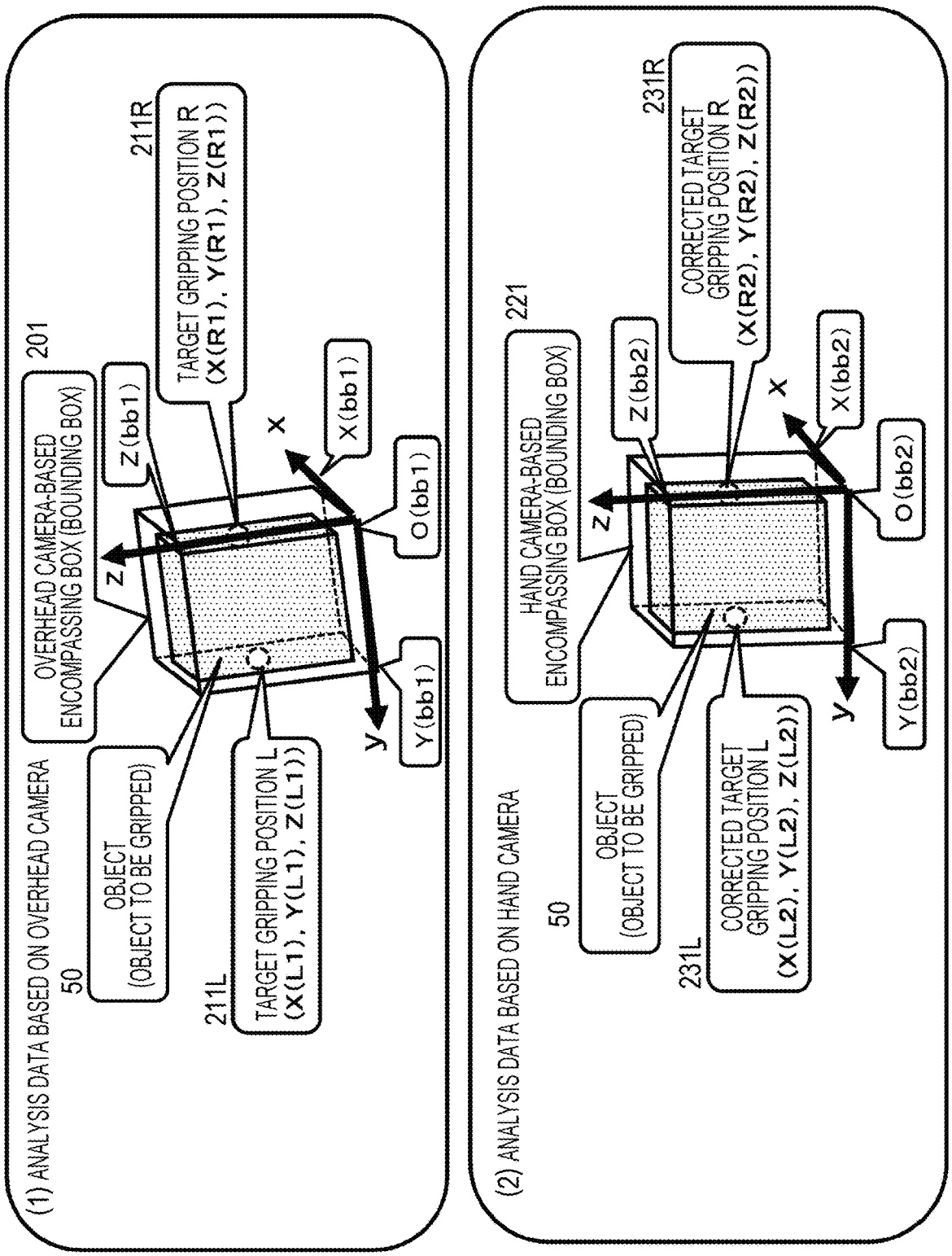
FIG. 17 is a diagram for describing a specific example of a corrected target gripping position calculation process executed by the robot control apparatus of the present disclosure.

FIG. 17 illustrates the following two drawing.

(1) Analysis data based on overhead camera (2) Analysis data based on hand camera The analysis data based on the overhead camera of (1) is data generated on the basis of an image captured by the overhead camera 122.

That is, this analysis data is data generated by the processes in steps S111 to S114 of the flow illustrated in FIG. 6, and corresponds to data described above with reference to FIG. 15.

The analysis data based on the hand camera of (2) is data generated on the basis of an image captured by the hand camera 132.

That is, this analysis data is data is generated by the processes in steps S121 to S123 of the flow illustrated in FIG. 6.

The analysis data based on the overhead camera of (1) illustrates each piece of the following data:

(1a) Object 50 which is object to be gripped;

(1b) Overhead camera-based encompassing box (bounding box) 201 that encompasses object 50 generated by object-to-be-gripped encompassing box generation unit 112 in step S113 of flow illustrated in FIG. 6; and (1c) Target gripping positions 211L and 211R set by user on basis of image captured by overhead camera 122 in step S111 of flow illustrated in FIG. 6.

Each of these pieces of data is illustrated on an overhead camera-based encompassing box coordinate system in a similar manner described above with reference to FIG. 15.

As described above, the overhead camera-based encompassing box coordinate system is a coordinate system in which sides of the overhead camera-based encompassing box (bounding box) 201 having a rectangular parallelepiped shape are set as X, Y, and Z axes, respectively, with one vertex of the encompassing box (bounding box) 201 as an origin (O(bb1)).

The overhead camera-based encompassing box (bounding box) 201 is defined as a rectangular parallelepiped having, as vertices, four points of the origin (O(bb1)) of the overhead camera-based encompassing box coordinate system, a point (X(bb1)) on the X axis, a point (Y(bb1)) on the Y axis, and a point (Z(bb1)) on the Z axis.

Moreover, FIG. 17(1) illustrates three-dimensional position coordinates of the target gripping positions in the overhead camera-based encompassing box coordinate system. The following two points are illustrated in FIG. FIG. 17(1).

Target gripping position L ((X(L1), Y(L1), Z(L1)), 211L

Target gripping position R (X(R1), Y(R1), Z(R1)), 211R

These two points are applied.

These target gripping positions are the gripping positions set by the user while viewing the image captured by the overhead camera using, for example, the input/output unit (user terminal) 180 as described above.

As described above with reference to FIG. 15, these coordinates of the target gripping positions illustrated in FIG. 17(1) are coordinates each indicating the relative positional relationship between the encompassing box (bounding box) of the object to be gripped in the image captured by the overhead camera and each of the target gripping position.

In step S123 of the flow of FIG. 6, the gripping position calculation unit 113 executes the following process.

That is, the process of calculating a corrected target gripping position, which is a relative position of the target gripping position with respect to the encompassing box (bounding box) of the object to be gripped in the image captured by the hand camera, is executed by applying a relative positional relationship between the target gripping position and the encompassing box (bounding box) of the object to be gripped in the image captured by the overhead camera.

Specifically, relative positions of the target gripping positions of the object to be gripped with respect to the encompassing box (bounding box) of the object to be gripped in the image captured by the overhead camera are calculated, target gripping positions with respect to a hand camera-based encompassing box in the image captured by the hand camera are calculated on the basis of the calculated relative positions, and the calculated positions are set as the corrected target gripping positions of the object to be gripped included in the image captured by the hand camera.

The corrected target gripping positions are corrected target gripping positions illustrated in FIG. 17(2).

That is, the process of calculating the following corrected target gripping positions illustrated in FIG. 17(2):

Corrected target gripping position L ((X(L2), Y(L2), Z(L2)), 231L; and

Corrected target gripping position R (X(R2), Y(R2), Z(R2)), 231R.

FIG. 17(2) illustrates each piece of the following data:
(2a) Object 50 which is object to be gripped;
(2b) Hand camera-based encompassing box (bounding box) 221 that encompasses object 50 generated by object-to-be-gripped encompassing box generation unit 112 in step S122 of flow illustrated in FIG. 6; and
(2c) Corrected target gripping positions 231L and 231R.

Each of these pieces of data is illustrated on a hand camera-based encompassing box coordinate system.

The hand camera-based encompassing box coordinate system is a coordinate system in which sides of the hand camera-based encompassing box (bounding box) 221 having a rectangular parallelepiped shape are set as X, Y, and Z axes, respectively, with one vertex of the hand camera-based encompassing box (bounding box) 221 as an origin (O(bb2)).

The hand camera-based encompassing box (bounding box) 221 is defined as a rectangular parallelepiped having, as vertices, four points of the origin (O(bb1)) on the hand camera-based encompassing box coordinate system, a point (X(bb1)) on the X axis, a point (Y(bb1)) on the Y axis, and a point (Z(bb1)) on the Z axis.

In step S123 of the flow of FIG. 6, the gripping position calculation unit 113 executes the process of calculating a corrected target gripping position, which is a relative position of the target gripping position with respect to the encompassing box (bounding box) of the object to be gripped in the image captured by the hand camera, by applying the relative positional relationship between the target gripping position and the encompassing box (bounding box) of the object to be gripped in the image captured by the overhead camera.

That is, the process of calculating the following positions illustrated in FIG. 17(2):

Corrected target gripping position L ((X(L2), Y(L2), Z(L2)), 231L; and

Corrected target gripping position R (X(R2), Y(R2), Z(R2)), 231R.

The process of calculating a corrected target gripping position executed by the gripping position calculation unit 113 is executed as follows.

First, relational expressions are generated, the relational expressions respectively indicating coordinates of the target gripping positions in the overhead camera-based encompassing box coordinate system included in the analysis data based on the overhead camera illustrated in FIG. 17(1), that is, the two points of the target gripping position L ((X(L1), Y(L1), Z(L1)), 211L, and the target gripping position R (X(R1), Y(R1), Z(R1)), 211R, using vertex data (X(bb1), Y(bb1), Z(bb1)) of the overhead camera-based encompassing box (bounding box) 201.

That is, the following relational expressions of (Relational Expression 1) and (Relational Expression 2) are generated.

Target gripping position $L((X(L1),Y(L1),Z(L1))=((lx)\cdot(X(bb1)),(ly)\cdot(Y(bb1)),(lz)\cdot(Z(bb1)))$ (Relational Expression 1)

Target gripping position $R((X(R1),Y(R1),Z(R1))=((rx)\cdot(X(bb1)),(ry)\cdot(Y(bb1)),(rz)\cdot(Z(bb1)))$ (Relational Expression 2)

Such two relational expressions (Relational Expression 1) and (Relational Expression 2) are generated.

Note that each of lx, ly, and lz shown in (Relational Expression 1) is a coefficient indicating a ratio of each of xyz coordinate positions of the coordinates (X(L1), Y(L1), Z(L1)) of the target gripping position L relative to a length of each side of the overhead camera-based encompassing box (bounding box) 201.

Similarly, each of rx, ry, and rz shown in (Relational Expression 2) is a coefficient indicating a ratio of each of xyz coordinate positions of the coordinates (X(R1), Y(R1), Z(R1)) of the target gripping position R relative to the length of each side of the overhead camera-based encompassing box (bounding box) 201.

The coefficients lx, ly, and lz and the coefficients rx, ry, and rz are calculated on the basis of these two relational expressions (Relational Expression 1) and (Relational Expression 2).

Next, a length (X(bb2), Y(bb2), Z(bb2)) of each side of the hand camera-based encompassing box (bounding box) 221 illustrated in the analysis data based on the hand camera illustrated in FIG. 17(2) is multiplied by the coefficients (lx, ly, lz, rx, ry, rz) calculated on the basis of the above-described Relational Expressions 1 and 2 to calculate the following corrected target gripping positions L and R:

Corrected target gripping position L ((X(L2), Y(L2), Z(L2)), 231L; and

Corrected target gripping position R (X(R2), Y(R2), Z(R2)), 231R.

That is, the corrected target gripping positions L and R are calculated using the following calculation formulas (Calculation Formula 1) and (Calculation Formula 2).

Corrected target gripping position $L((X(L2),Y(L2),Z(L2))=((lx)\cdot(X(bb2)),(ly)\cdot(Y(bb2)),(lz)\cdot(Z(bb2)))$ (Calculation Formula 1)

Corrected target gripping position $R((X(R2),Y(R2),Z(R2))=((rx)\cdot(X(bb2)),(ry)\cdot(Y(bb2)),(rz)\cdot(Z(bb2)))$ (Calculation Formula 2)

The corrected target gripping positions L and R are calculated by these two calculation formulas (Calculation Formula 1) and (Calculation Formula 2).

With the above-described processing, the gripping position calculation unit 113 executes the process of calculating a corrected target gripping position which is a relative position of the target gripping position with respect to the encompassing box (bounding box) of the object to be gripped in the image captured by the hand camera in step S123 of the flow of FIG. 6.

The corrected target gripping positions in the image captured by the hand camera 132 set by this process are positions respectively corresponding to the target gripping positions set by the user while viewing the image captured by the overhead camera 122.

Therefore, the robot control apparatus 100 can stably grip the object 50 by observing the image captured by the hand camera 132 and bringing a gripper of the hand into contact with the corrected target gripping positions, which are the relative positions of the target gripping positions with respect to the encompassing box (bounding box) of the object to be gripped in the image captured by the hand camera, to perform the process of gripping the object 50.

As described above, the robot control apparatus 100 of the present disclosure generates the following two object-to-be-gripped encompassing boxes (bounding boxes) of the object to be gripped in the images captured by different cameras, that is,
- (a) the object-to-be-gripped encompassing box (bounding box) of the object to be gripped in the image captured by the overhead camera, and
- (b) the object-to-be-gripped encompassing box (bounding box) of the object to be gripped in the image captured by the hand camera, and
- makes a relative position between each of the encompassing boxes (bounding boxes) and each of gripping positions consistent, thereby calculating which position of the object to be gripped included in the image captured by the hand camera the target gripping position set by the user corresponds to.

This calculated position is defined as a corrected target gripping position.

The control information generation unit 114 generates control information for causing the hand of the robot to grip the "corrected target gripping position" calculated by the gripping position calculation unit 113. This control information is output to the drive unit 141 of the robot movement unit 140 and the drive unit 131 of the robot hand unit 130.

The drive unit 141 of the robot movement unit 140 and the drive unit 131 of the robot hand unit 130 execute the drive processing in accordance with the control information generated by the control information generation unit 114, that is, the control information to cause the hand of the robot to grip the "corrected target gripping position" calculated by the gripping position calculation unit 113.

With this drive processing, the hand of the robot can grip the "corrected target gripping position".

The "corrected target gripping position" is a gripping position that coincides with the target gripping position specified by the user while viewing a bird's-eye view image, and is a gripping position set on the object to be gripped included in the image captured by the hand camera. Since the hand of the robot grips the corrected target gripping position set on the object to be gripped included in the image captured by the hand camera, the object can be stably gripped.

[5. Regarding Modification Examples and Application Examples of Robot Control Apparatus of Present Disclosure]

Next, modification examples and application examples of the above-described robot control apparatus of the present disclosure will be described.

Modification examples and application examples of the following items will be sequentially described.

(1) Regarding Processing Procedure of Flow Illustrated in FIG. 6
(2) Regarding Process in Step S111 of Flow Illustrated in FIG. 6
(3) Regarding Process in Step S112 of Flow Illustrated in FIG. 6
(4) Regarding Processes in Step S113 and Subsequent Steps of Flow Illustrated in FIG. 6
(5) Regarding Processes in Step S114 and Step S123 of Flow Illustrated in FIG. 6

(1) Regarding Processing Procedure of Flow Illustrated in FIG. 6

As described above, the processes in steps S111 to S114 in the flow illustrated in FIG. 6 are the processes executed on the basis of the image (including distance image) captured by the overhead camera 122 of the robot head 120.

On the other hand, processes in steps S121 to S123 in the flow illustrated in FIG. 6 are processes executed on the basis of an image (including a distance image) captured by the hand camera 132 of the robot hand unit 130.

Among these processes, the processes in steps S111 to S114 executed on the basis of the image (including the distance image) captured by the overhead camera 122 and the processes in steps S121 to S122 executed on the basis of the image (including the distance image) captured by the hand camera 132 can be executed in parallel.

Furthermore, the processes in steps S121 to S122 may be executed after the end of the processes in steps S111 to S114.

However, the process in step S123 is executed after the end of the processes in steps S111 to S114 executed on the basis of the image (including the distance image) captured by the overhead camera 122 and the processes in steps S121 to S122 executed on the basis of the image (including the distance image) captured by the hand camera 132.

The processing procedure is preferably set such that the object 50, which is the object to be gripped, can be reliably observed in the captured images of the overhead camera 122 and the hand camera 132.

It is possible to avoid processing in a state in which occlusion occurs in the object to be gripped due to a blockage of the field of view of the overhead camera 122 by a portion such as an arm or a hand, for example, by controlling the processing procedure.

(2) Regarding Process in Step S111 of Flow Illustrated in FIG. 6

In step S111 of the flow illustrated in FIG. 6, a process of inputting specification information of the object to be gripped using the image captured by the overhead camera and specification information of the target gripping position is performed.

That is, as described above with reference to FIG. 7, the user inputs the specification information of the object to be gripped and the specification information of the target gripping position while viewing the image captured by the overhead camera using the input/output unit (user terminal) 180.

Although it is configured to input the rectangular region surrounding the object is input in the specification of the object to be gripped, this is merely an example, and for example, it may be configured to perform a process of touching a part of the object or a process of specifying various objects as described in Patent Document 2 (Japanese Patent Application Laid-Open No. 2013-184257) which is a prior patent application of the present applicant.

Furthermore, processing in which a user selects a rectangle corresponding to an object may be performed after performing object detection (R-CNN, YOLO, SSD, or the like) by deep learning, which is machine learning processing.

Furthermore, a method of extracting objects in units of pixels by semantic segmentation and allowing the user to select an object may be applied.

Moreover, in a case where a target gripping position has already been determined, it may be configured to perform a process of automatically selecting an object closest to the target gripping position.

Furthermore, as for a method of determining the target gripping position, the user may specify only an object to be gripped instead of directly determining a position and an orientation, and the target gripping position may be autonomously determined by carrying out a gripping plan.

(3) Regarding Process in Step S112 of Flow Illustrated in FIG. 6

In step S112 of the flow illustrated in FIG. 6, processing is performed to execute the process of extracting the point cloud of the object to be gripped in the image captured by the overhead camera.

This processing is executed as the process of extracting the object point cloud corresponding to the rectangular region specified by the user as described above with reference to FIG. 8.

This point cloud extraction process may also be executed by applying foreground extraction, such as min-cut based segmentation, similarly to the process of specifying the object to be gripped in step S111.

Note that, in this case, it is possible to roughly remove an irrelevant point cloud by performing foreground extraction on the basis of a certain point representing a point cloud of the object indicated by the user or a point corresponding to the center of the rectangular region and a rough size of a gripped object set in advance.

(4) Regarding Processes in Step S113 and Subsequent Steps of Flow Illustrated in FIG. 6

Although the embodiment of using the gripper-type hand as the shape of the hand of the robot in the processes in step S113 and the subsequent steps of the flow illustrated in FIG. 6 has been described, it is possible to calculate a corrected target gripping position corresponding to a target gripping position and execute a stable gripping process similarly to the above-described embodiment by defining representative points of a hand according to a shape of the hand for, for example, other types such as a hand including three or more multiple fingers and a suction hand.

For example, in a five-finger hand, five target gripping positions of contact points of the respective fingers are prepared, and relative positions with respect to encompassing boxes (bounding boxes) respectively set in an image captured by the overhead camera and an image captured by the hand camera are calculated for all the points. With such processing, corrected target gripping positions corresponding to the target gripping positions corresponding to the contact points of the respective fingers of the five-finger hand can be calculated.

(5) Regarding Processes in Step S114 and Step S123 of Flow Illustrated in FIG. 6

In steps S114 and S123 of the flow illustrated in FIG. 6, the process of calculating the relative positional relationship has been performed for all of the x, y, and z coordinates as the process of calculating the relative positional relationship between the encompassing box (bounding box) of the object to be gripped and the gripping position as described above with reference to FIGS. 15 and 17.

Furthermore, in step S123, the process of calculating the corrected target gripping position, which is the relative position of the target gripping position with respect to the encompassing box (bounding box) of the object to be gripped in the image captured by the hand camera, is executed by applying the relative positional relationship between the target gripping position and the encompassing box (bounding box) of the object to be gripped in the image captured by the overhead camera.

However, for example, in a case where there is a component having a significantly different shape between encompassing boxes (bounding boxes) due to a difference in viewpoint between the overhead camera and the hand camera, it may be configured not to perform a process of calculating a corrected target gripping position for the component but to perform a process of calculating only a component having a similar shape between the encompassing boxes (bounding boxes). For example, it is only required to calculate only a y component in a case where it is desired to correct a shift of the object in the y direction in order to put the object into the hand such that the gripper can sandwich the object. Furthermore, a process of preferentially calculating a z component may be performed in a case where it is desired to reflect the user's instruction to hold the object to be gripped at a portion as high as possible.

[6. Regarding Hardware Configuration Example of Robot Control Apparatus of Present Disclosure]

Next, an example of a hardware configuration of the robot control apparatus of the present disclosure will be described.

The robot control apparatus described in the above-described embodiment can be configured as an apparatus different from the robot itself, and furthermore, can also be configured as an apparatus inside the robot.

The robot control apparatus can also be achieved using, for example, an information processing apparatus such as a PC.

A configuration example of the information processing apparatus constituting the robot control apparatus of the present disclosure will be described with reference to FIG. 18.

A central processing unit (CPU) 301 functions as a control unit or a data processor that executes various processes according to a program stored in a read only memory (ROM) 302 or a storage unit 308. For example, the processing according to the sequence described in the above-described embodiments is performed. The program to be executed by the CPU 301, data, and the like are stored in a random access memory (RAM) 303. The CPU 301, the ROM 302, and the RAM 303 are mutually connected via a bus 304.

The CPU 301 is connected to an input/output interface 305 via the bus 304. and an input unit 306 including various switches, a keyboard, a mouse, a microphone, and a sensor, and an output unit 307 including a display and a speaker are connected to the input/output interface 305. The CPU 301 executes various processes in response to an instruction input from the input unit 306, and outputs processing results to, for example, the output unit 307.

The storage unit 308 connected to the input/output interface 305 is configured using, for example, a hard disk, and stores a program to be executed by the CPU 301 and various types of data. A communication unit 309 functions as a transmission/reception unit of Wi-Fi communication, Bluetooth (registered trademark) (BT) communication, and other data communication via a network such as the Internet and a local area network, and communicates with an external apparatus.

A drive 310 connected to the input/output interface 305 drives a removable medium 311 such as a magnetic disk, an optical disk, a magneto-optical disk, and a semiconductor memory such as a memory card, and executes data recording or reading.

[7. Summary of Configuration of Present Disclosure]

The embodiments of the present disclosure have been described in detail with reference to the specific embodiments. However, it is self-evident that those skilled in the art can make modifications and substitutions of the embodiments within a scope not departing from a gist of the present disclosure. In other words, the present invention has been disclosed in the form of exemplification, and should not be interpreted restrictively. In order to determine the gist of the present disclosure, the scope of claims should be taken into consideration.

Note that the technology disclosed in the present specification can have the following configurations.

(1) A robot control apparatus including:
   an encompassing box generation unit that generates a first camera-based encompassing box that encompasses an object to be gripped included in an image captured by a first camera mounted on a robot, and a second camera-based encompassing box that encompasses the object to be gripped included in an image captured by a second camera mounted on the robot;
   a gripping position calculation unit that calculates a relative position of a target gripping position of the object to be gripped with respect to the first camera-based encompassing box in the image captured by the first camera, calculates the target gripping position with respect to the second camera-based encompassing box in the image captured by the second camera on the basis of the calculated relative position, and sets the calculated position as a corrected target gripping position of the object to be gripped included in the image captured by the second camera; and
   a control information generation unit that generates control information for causing a hand of the robot to grip the corrected target gripping position in the image captured by the second camera.

(2) The robot control apparatus according to (1), in which the first camera is an overhead camera that captures a bird's-eye view image, and the second camera is a hand camera that captures an image from the hand performing a process of gripping the object to be gripped or a position close to the hand.

(3) The robot control apparatus according to (2), in which the first camera is the overhead camera that is mounted on a head of the robot and captures the bird's-eye view image from the head.

(4) The robot control apparatus according to any one of (1) to (3), in which
the target gripping position is a gripping position specified by a user viewing an image of a display unit that displays the image captured by the first camera.

(5) The robot control apparatus according to (4), in which the target gripping position is a gripping position determined, as a position at which the object to be gripped is stably grippable, by the user who has viewed the image of the display unit that displays the image captured by the first camera.

(6) The robot control apparatus according to any one of (1) to (5), further including
   a point cloud extraction unit that executes a process of extracting a three-dimensional point cloud indicating the object to be gripped included in each of the image captured by the first camera and the image captured by the second camera.

(7) The robot control apparatus according to (6), in which the encompassing box generation unit generates an encompassing box including the three-dimensional point cloud generated by the point cloud extraction unit.

(8) The robot control apparatus according to (6) or (7), in which
the encompassing box generation unit generates a bounding box that is an encompassing box having a rectangular parallelepiped shape and encompassing the three-dimensional point cloud generated by the point cloud extraction unit.

(9) The robot control apparatus according to any one of (1) to (8), in which
the encompassing box generation unit generates the first camera-based encompassing box in the image captured by the first camera and the second camera-based encompassing box in the image captured by the second camera as encompassing boxes having the same shape.

(10) The robot control apparatus according to any one of (1) to (9), in which
the encompassing box generation unit generates an encompassing box having a side parallel to a vertical plane perpendicular to an approach direction of the hand of the robot with respect to the object to be gripped.

(11) The robot control apparatus according to any one of (1) to (10), in which
the encompassing box generation unit generates an encompassing box having a support plane supporting the object to be gripped as a constituent plane in a case where the support plane exists.

(12) The robot control apparatus according to any one of (1) to (11), in which
the encompassing box generation unit generates an encompassing box having a projection plane as a constituent plane, the projection plane being generated by projecting the object to be gripped onto a vertical plane parallel to an approach direction of the hand of the robot in a case where a support plane supporting the object to be gripped does not exist.

(13) A robot control method executed in a robot control apparatus, the robot control method including:
an encompassing box generation step of generating, by an encompassing box generation unit, a first camera-based encompassing box that encompasses an object to be gripped included in an image captured by a first camera mounted on a robot, and a second camera-based encompassing box that encompasses the object to be gripped included in an image captured by a second camera mounted on the robot;
a gripping position calculation step of calculating, by a gripping position calculation unit, a relative position of a target gripping position of the object to be gripped with respect to the first camera-based encompassing box in the image captured by the first camera, calculates the target gripping position with respect to the second camera-based encompassing box in the image captured by the second camera on the basis of the calculated relative position, and sets the calculated position as a corrected target gripping position of the object to be gripped included in the image captured by the second camera; and a control information generation step of generating, by a control information generation unit, control information for causing a hand of the robot to grip the corrected target gripping position in the image captured by the second camera.

(14) A program configured to execute robot control processing in a robot control apparatus, the program including:

causing an encompassing box generation unit to execute an encompassing box generation step of generating a first camera-based encompassing box that encompasses an object to be gripped included in an image captured by a first camera mounted on a robot, and a second camera-based encompassing box that encompasses the object to be gripped included in an image captured by a second camera mounted on the robot;

causing a gripping position calculation unit to execute a gripping position calculation step of calculating a relative position of a target gripping position of the object to be gripped with respect to the first camera-based encompassing box in the image captured by the first camera, calculates the target gripping position with respect to the second camera-based encompassing box in the image captured by the second camera on the basis of the calculated relative position, and sets the calculated position as a corrected target gripping position of the object to be gripped included in the image captured by the second camera; and causing a control information generation unit to execute a control information generation step of generating control information for causing a hand of the robot to grip the corrected target gripping position in the image captured by the second camera.

Note that the series of processing described in the specification can be executed by hardware, software, or a complex configuration of the both. In a case where the processing is executed using software, it is possible to execute the processing by installing a program recording a processing sequence on a memory in a computer built into dedicated hardware or by installing a program in a general-purpose computer that can execute various processes. For example, the program can be recorded in a recording medium in advance. In addition to installing on a computer from the recording medium, it is possible to receive a program via a network, such as a local area network (LAN) and the Internet, and install the received program on a recording medium such as a built-in hard disk.

Furthermore, various processes described in the specification not only are executed in a time-series manner according to the description but also may be executed in parallel or separately depending on the processing performance of an apparatus that executes the process or need. Furthermore, the term "system" in the present specification refers to a logical set configuration of a plurality of apparatuses, and is not limited to a system in which apparatuses of the respective configurations are provided in the same housing.

INDUSTRIAL APPLICABILITY

According to a configuration of an embodiment of the present disclosure, an apparatus and a method that enable reliable execution of an object gripping process performed by a robot are achieved as described above.

Specifically, for example, an overhead camera-based encompassing box that encompasses an object to be gripped included in an image captured by an overhead camera mounted on a robot and a hand camera-based encompassing box that encompasses the object to be gripped included in an image captured by a hand camera mounted on the robot are generated. Moreover, a relative position of a target gripping position of the object to be gripped with respect to the overhead camera-based encompassing box in the image captured by the overhead camera is calculated, the target gripping position with respect to the hand camera-based encompassing box in the image captured by the hand camera is calculated on the basis of the calculated relative position, and the calculated position is set as a corrected target gripping position of the object to be gripped included in the image captured by the hand camera. Moreover, control information for causing a hand of the robot to grip the corrected target gripping position in the image captured by the hand camera is generated, and a gripping process performed by the robot is executed.

According to this configuration, the apparatus and the method that enable the reliable execution of the object gripping process performed by the robot are achieved.

REFERENCE SIGNS LIST

10 Robot
20 Head
21 Overhead camera
30 Hand
31 Hand camera
50 Object (object to be gripped)
100 Robot control apparatus
110 Data processor
111 Object-to-be-gripped point cloud extraction unit
112 Object-to-be-gripped encompassing box generation unit
113 Gripping position calculation unit
114 Control information generation unit
120 Robot head
121 Drive unit
122 Overhead camera
130 Robot hand unit
131 Drive unit
132 Hand camera
140 Robot movement unit
141 Drive unit
142 Sensor
201 Overhead camera-based encompassing box (bounding box)
211 Target gripping position
221 Hand camera-based encompassing box (bounding box)
231 Corrected target gripping position
301 CPU
302 ROM
303 RAM
304 Bus
305 Input/output interface
306 Input unit
307 Output unit
308 Storage unit
309 Communication unit
310 Drive
311 Removable medium

The invention claimed is:

1. A robot control apparatus comprising:
a first camera that is mounted on a robot and captures a first image;
a second camera that is mounted on a hand of the robot and captures a second image; and circuitry including a CPU that is configured to
acquire information about an object to be gripped by the hand and target gripping positions the target gripping positions being specified by a user in the first image as contact points between the hand and the object at which the hand is controlled to grip the object,
generate a first camera-based encompassing box that encompasses the object in the first image, and a second camera-based encompassing box that encompasses the object in the second image,
calculate first relative positions of the target gripping positions with respect to the first camera-based encompassing box in the first image,
calculate second relative positions of the target gripping positions with respect to the second camera-based encompassing box in the second image, based on the first relative positions that were calculated with respect to the first camera-based encompassing box in the first image,
set the second relative positions of the target gripping positions as corrected target gripping positions in the second image, and
generate control information for causing the hand of the robot to grip the object at the corrected target gripping positions in the second image.

2. The robot control apparatus according to claim 1, wherein
the first camera is an overhead camera that captures a bird's-eye view image, and
the second camera is a hand camera that captures an image from the hand performing a process of gripping the object to be gripped or a position close to the hand.

3. The robot control apparatus according to claim 2, wherein
the first camera is the overhead camera that is mounted on a head of the robot and captures the bird's-eye view image from the head.

4. The robot control apparatus according to claim 1, wherein
the target gripping positions are specified by the user viewing on a display the first image captured by the first camera.

5. The robot control apparatus according to claim 4, wherein
the target gripping positions are determined, as the contact points at which the object to be gripped is stably grippable, by the user who has viewed on the display the first image captured by the first camera.

6. The robot control apparatus according to claim 1, wherein
the circuitry is further configured to execute a process of extracting a three-dimensional point cloud indicating the object in each of the first image captured by the first camera and the second image captured by the second camera.

7. The robot control apparatus according to claim 6, wherein
the circuitry is further configured to generate an encompassing box including the three-dimensional point cloud that is generated.

8. The robot control apparatus according to claim 6, wherein
the circuitry is further configured to generate a bounding box that is an encompassing box having a rectangular parallelepiped shape and encompassing the three-dimensional point cloud.

9. The robot control apparatus according to claim 1, wherein
the circuitry is further configured to generate the first camera-based encompassing box in the first image captured by the first camera and the second camera-based encompassing box in the second image captured by the second camera as encompassing boxes having a same shape.

10. The robot control apparatus according to claim 1, wherein
the circuitry is further configured to generate an encompassing box having a side parallel to a vertical plane perpendicular to an approach direction of the hand of the robot with respect to the object to be gripped.

11. The robot control apparatus according to claim 1, wherein
the circuitry is further configured to generate an encompassing box having a support plane supporting the object to be gripped as a constituent plane in a case where the support plane exists.

12. The robot control apparatus according to claim 1, wherein
the circuitry is further configured to generate an encompassing box having a projection plane as a constituent plane, the projection plane being generated by projecting the object to be gripped onto a vertical plane parallel to an approach direction of the hand of the robot in a case where a support plane supporting the object to be gripped does not exist.

13. A robot control method executed in a robot control apparatus that includes a first camera mounted on a robot, a second camera mounted on a hand of the robot, and circuitry including a CPU, the robot control method comprising:
capturing a first image by the first camera:
capturing a second image by the second camera;
acquiring, by the circuitry, information about an object to be gripped by the hand and target gripping positions, the target gripping positions being specified by a user in the first image as contact points between the hand and the object at which the hand is controlled to grip the object;
generating, by the circuitry, a first camera-based encompassing box that encompasses the object in the first image, and a second camera-based encompassing box that encompasses the object in the second image;
calculating, by the circuitry, first relative positions of the target gripping positions with respect to the first camera-based encompassing box in the first image;
calculating, by the circuitry, second relative positions of the target gripping positions with respect to the second camera-based encompassing box in the second image, based on the first relative positions that were calculated with respect to the first camera-based encompassing box in the first image;
setting, by the circuitry, the second relative positions of the target gripping positions as corrected target gripping positions in the second image; and
generating, by the circuitry, control information for causing the hand of the robot to grip the object at the corrected target gripping positions in the second image.

14. A non-transitory computer-readable storage medium storing a program for causing a robot control apparatus that includes a first camera mounted on a robot, a second camera mounted on a hand of the robot, and circuitry including a CPU, to execute robot control processing, the robot control processing comprising:

capturing a first image by the first camera;
capturing a second image by the second camera;
acquiring, by the circuitry, information about an object to be gripped by the hand and target gripping positions, the target gripping positions being specified by a user in the first image as contact points between the hand and the object at which the hand is controlled to grip the object;
generating, by the circuitry, a first camera-based encompassing box that encompasses the object in the first image, and a second camera-based encompassing box that encompasses the object in the second image;
calculating, by the circuitry, first relative positions of the target gripping positions with respect to the first camera-based encompassing box in the first image;
calculating, by the circuitry, second relative positions of the target gripping positions with respect to the second camera-based encompassing box in the second image, based on the first relative positions that were calculated with respect to the first camera-based encompassing box in the first image;
setting, by the circuitry, the second relative positions of the target gripping positions as corrected target gripping positions in the second image; and
generating, by the circuitry, control information for causing the hand of the robot to grip the object at the corrected target gripping positions in the second image.

* * * * *